US011697209B1

(12) United States Patent
Mourlam et al.

(10) Patent No.: US 11,697,209 B1
(45) Date of Patent: Jul. 11, 2023

(54) COORDINATE MAPPING FOR MOTION CONTROL

(71) Applicant: Altec Industries, Inc., Birmingham, AL (US)

(72) Inventors: Timothy J. Mourlam, Shawnee, KS (US); Jonathan Westin Sykes, Gower, MO (US); Riley Gossling, Stanberry, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 17/875,893

(22) Filed: Jul. 28, 2022

(51) Int. Cl.
| | | |
|---|---|---|
| *B25J 9/16* | (2006.01) | |
| *B25J 13/02* | (2006.01) | |
| *B25J 13/06* | (2006.01) | |
| *B25J 13/08* | (2006.01) | |
| *B66F 11/04* | (2006.01) | |

(52) U.S. Cl.
CPC .......... *B25J 9/1689* (2013.01); *B25J 9/1643* (2013.01); *B25J 9/1676* (2013.01); *B25J 13/025* (2013.01); *B25J 13/065* (2013.01); *B25J 13/088* (2013.01); *B66F 11/046* (2013.01)

(58) Field of Classification Search
CPC ...... B25J 9/1689; B25J 9/1643; B25J 9/1676; B25J 13/025; B25J 13/065; B25J 13/088; B66F 11/046
See application file for complete search history.

(56) References Cited

U.S. PATENT DOCUMENTS

| | | |
|---|---|---|
| 3,139,948 A | 7/1964 | Rorden |
| 4,831,662 A | 5/1989 | Kuhn |
| 5,196,998 A | 3/1993 | Fulton |
| 6,250,588 B1 | 6/2001 | Numbers |
| 6,325,749 B1 | 12/2001 | Inokuchi et al. |
| 6,507,163 B1 | 1/2003 | Allen |
| 7,224,382 B2 | 5/2007 | Baker |
| 2003/0174286 A1 | 9/2003 | Trumbull |
| 2006/0045294 A1 | 3/2006 | Smyth |
| 2007/0192910 A1 | 8/2007 | Vu et al. |
| 2014/0014637 A1 | 1/2014 | Hunt et al. |
| 2015/0015708 A1 | 1/2015 | Collett et al. |
| 2015/0312468 A1 | 10/2015 | Taylor et al. |

(Continued)

FOREIGN PATENT DOCUMENTS

| | | |
|---|---|---|
| JP | 5285880 B2 | 9/2013 |
| JP | 6840052 B2 * | 3/2021 |

OTHER PUBLICATIONS

Faucher et al. "Ground operated teleoperation system for live power line maintenance" (Year: 1996).

(Continued)

*Primary Examiner* — Basil T. Jos
(74) *Attorney, Agent, or Firm* — Erise IP, P.A.

(57) ABSTRACT

Systems and methods for controlling motion of remotely operated equipment such that a motion path is automatically determined for a plurality of joints of the remotely operated equipment based on an updated target position input received from an operator, a current position of the remotely operated equipment, and predetermined parameters indicative of the geometry of the plurality of joints. An optimized motion path may be provided that avoids detected obstacles and joint singularities of the remotely operated equipment.

20 Claims, 9 Drawing Sheets

(56) References Cited

U.S. PATENT DOCUMENTS

| | | |
|---|---|---|
| 2017/0340969 A1 | 11/2017 | Lim et al. |
| 2018/0011681 A1 | 1/2018 | Kada |
| 2018/0032130 A1 | 2/2018 | Meglan |
| 2018/0037172 A1 | 2/2018 | Nelson et al. |
| 2018/0057322 A1 | 3/2018 | Schiller |
| 2018/0243921 A1 | 8/2018 | Hashimoto et al. |
| 2018/0313885 A1 | 11/2018 | Bilic et al. |
| 2019/0176334 A1* | 6/2019 | Zhou ................... B25J 9/1679 |
| 2019/0201136 A1* | 7/2019 | Shelton, IV ....... A61B 17/0206 |
| 2019/0256335 A1* | 8/2019 | Araki ...................... B66F 9/06 |
| 2020/0139227 A1 | 5/2020 | Mikhailov |
| 2021/0001483 A1* | 1/2021 | Milenkovic ............. B25J 9/046 |

OTHER PUBLICATIONS

Aracil et al. "ROBTET a new teleoperated system for live-line maintenance" (Year: 1995).

Du et al. "A teleoperated robotic hot stick platform for the overhead live powerline maintenance tasks" (Year: 2019).

Aracil et al. "Advanced Teleoperated System for Live Power Line Maintenance" (Year: 2001).

* cited by examiner

COORDINATE MAPPING FOR MOTION CONTROL

BACKGROUND

1. Field

Embodiments of the invention relate to motion control based on coordinate mapping. More specifically, embodiments of the invention relate to remotely controlling motion of robotic arms and/or a boom assembly.

2. Related Art

Typically, boom assemblies are controlled using complex inputs by which each individual joint of the boom assembly is moved separately. Accordingly, operators must provide a complex series of inputs in order to yield a seemingly simple movement of the overall boom assembly. These movement control techniques are not intuitive and therefore require extensive training before operators become competent at fluidly controlling the boom assembly. Further, load monitoring and feedback for remotely operated equipment is typically not applied dynamically such that operators are not notified until after a maximum capacity is met or exceeded.

Additionally, typical control of robotic equipment relies on open form calculations that use guess and check techniques to converge onto a solution. However, these calculations are slow with relatively high latency and are, therefore, not suited for real-time manual control. The high latency produces input lag making real-time control feel unresponsive and leading to overcorrections that render said real-time control ineffective.

SUMMARY

Embodiments solve the above-mentioned problems by providing systems and methods for controlling motion of one or more items of remotely operated equipment. Control inputs are received from one or more user devices requesting motion of the remotely operated equipment and a motion path is determined based on the received control inputs and one or more parameters associated with the geometry and current position of the remotely operated equipment.

In some embodiments, a three-dimensional point cloud may be generated in real-time for a work area of the remotely controlled equipment from depth data captured by one or more sources. Accordingly, the motion path may be further updated based on the depth data and the point cloud to avoid collisions, avoid singularities, and interact with objects in the work area.

In a first embodiment, the techniques described herein relate to a method of controlling motion of a remotely operated equipment communicatively coupled to at least one input device of an operator, the method including receiving predetermined parameters based on one or more dimensions of the remotely operated equipment including a length of one or more members of the remotely operated equipment, receiving information indicative of a current position of the remotely operated equipment, the information including an angle of rotation of one or more joints of the remotely operated equipment, receiving a control signal from the at least one input device, the control signal indicative of an updated target position requested by the operator, determining a motion path for the remotely operated equipment by applying a closed-form inverse kinematics function based on the current position of the remotely operated equipment, the updated target position, and the predetermined parameters, and updating a control system of the remotely operated equipment with the motion path, wherein the motion path includes instructions for adjusting the angle of rotation of the one or more joints of the remotely operated equipment.

In a second embodiment, the techniques described herein relate to the method of the first embodiment, further including monitoring a speed associated with the motion path of the remotely operated equipment, and if the speed is above a predetermined threshold, reducing one or more speed parameters of the motion path.

In a third embodiment, the techniques described herein relate to the method of the first and second embodiments, further including receiving a selection of a selected tool from a plurality of tool associated with the remotely operated equipment, and shifting the updated target position based on the selected tool of the remotely operated equipment.

In a fourth embodiment, the techniques described herein relate to the method of the first through third embodiments, wherein the information indicative of the current position of the remotely operated equipment further includes a position and an angle of rotation of the selected tool.

In a fifth embodiment, the techniques described herein relate to the method of the first through fourth embodiments, further including receiving, from the at least one input device, a user input requesting to lock the remotely operated equipment in place, responsive to receiving the user input, temporarily preventing motion of the remotely operated equipment, receiving an adjustment of a position of the at least one input device while the remotely operated equipment is locked in place, and resuming motion of the remotely operated equipment responsive to a subsequent user input from the at least one input device requesting to resume motion of the remotely operated equipment.

In a sixth embodiment, the techniques described herein relate to the method of the first through fifth embodiments, further including preemptively monitoring one or more potential collisions of the remotely operated equipment, and automatically adjusting the motion path to avoid the one or more potential collisions of the remotely operated equipment.

In seventh embodiment, the techniques described herein relate to the method of the first through sixth embodiments, further including preemptively monitoring one or more potential singularities of the remotely operated equipment, and automatically adjusting the motion path to avoid the one or more potential singularities of the remotely operated equipment.

In an eighth embodiment, the techniques described herein relate to a system for remote motion control, the system including a boom assembly communicatively coupled to at least one input device of an operator, the boom assembly including a plurality of boom sections, and one or more cylinders disposed at joints of the plurality of boom sections, a control system including at least one processor programmed to execute a method of controlling motion of the boom assembly, the method including receiving predetermined parameters based on one or more dimensions of the boom assembly, receiving information indicative of a current position of the boom assembly, the information including an extension of the one or more cylinders of the boom assembly, and an angle of rotation of the boom assembly, receiving a control signal from the at least one input device, the control signal indicative of an updated target position for a boom tip of the boom assembly requested by the operator, determining a motion path for the boom assembly based on the current position of the boom assembly, the updated target position for the boom tip, and the predetermined parameters, and updating a control system of the boom assembly with the motion path, wherein the motion path includes instructions for adjusting the extension of the one or more cylinders of the boom assembly and instructions for adjusting the angle of rotation of the boom assembly.

In a ninth embodiment, the techniques described herein relate to the system of the eighth embodiment, wherein the information indicative of the current position of the boom assembly further includes a payout length of a winch line associated with the boom assembly.

In a tenth embodiment, the techniques described herein relate to the system of the eighth and ninth embodiments, the method further including monitoring the payout length of the winch line, and adjusting the motion path based on the payout length of the winch line to avoid a two-blocking condition of the boom assembly.

In an eleventh embodiment, the techniques described herein relate to the system of the eighth through the tenth embodiments, wherein the motion path for the boom assembly includes an adjustment to the angle of rotation of the boom assembly, an adjustment to the extension of the one or more cylinders of the boom assembly, and an adjustment to the payout length of the winch line.

In a twelfth embodiment, the techniques described herein relate to the system of the eighth through the eleventh embodiments, wherein the extension of the one or more cylinders of the boom assembly is measured via one or more magnetostrictive sensors and the angle of rotation of the boom assembly is measured via a rotary encoder disposed on the boom assembly.

In a thirteenth embodiment, the techniques described herein relate to the system of the eighth through the twelfth embodiments, wherein the motion path is determined by applying a closed-form inverse kinematics function based on the current position of the boom assembly, the updated target position for the boom tip, and the predetermined parameters.

In a fourteenth embodiment, the techniques described herein relate to the system of the eighth through the thirteenth embodiments, wherein the at least one input device includes at least one 3-axis joystick or at least one 6-axis joystick.

In a fifteenth embodiment, the techniques described herein relate to a method of controlling motion of a robotic arm communicatively coupled to at least one input device of an operator, the at least one input device including a position sensitive controller configured to be held by the operator, the method including receiving predetermined parameters based on one or more dimensions of the robotic arm including a length of one or more members of the robotic arm, receiving information indicative of a current position of the robotic arm, the information including an angle of rotation of the one or more members of the robotic arm, receiving a control signal from the at least one input device, the control signal indicative of an updated target position corresponding to a position of the position sensitive controller, determining a motion path for the robotic arm by applying a closed-form inverse kinematics function based on the current position of the robotic arm, the updated target position, and the predetermined parameters, and updating a control system of the robotic arm with the motion path to sync motion of a point on the robotic arm with motion of the position sensitive controller.

In a sixteenth embodiment, the techniques described herein relate to the method of the fifteenth embodiment, further including preemptively monitoring one or more potential singularities of the robotic arm, and providing, via the at least one input device, a notification indicative of the one or more potential singularities of the robotic arm.

In a seventeenth embodiment, the techniques described herein relate to the method of the fifteenth and the sixteenth embodiments, wherein the notification initiates activation of a haptic feedback response within the position sensitive controller.

In an eighteenth embodiment, the techniques described herein relate to the method of the fifteenth through the seventeenth embodiments, further including transmitting information indicative of the motion path across a dielectric gap via one or more fiber-optic cables to the control system of the robotic arm.

In a nineteenth embodiment, the techniques described herein relate to the method of the fifteenth through the eighteenth embodiments, further including determining a speed for the motion path relative to a speed of the position sensitive controller.

In a twentieth embodiment, the techniques described herein relate to the method of the fifteenth through the nineteenth embodiments, further including adjusting the motion path of the robotic arm based on a type of intended operation of the robotic arm.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
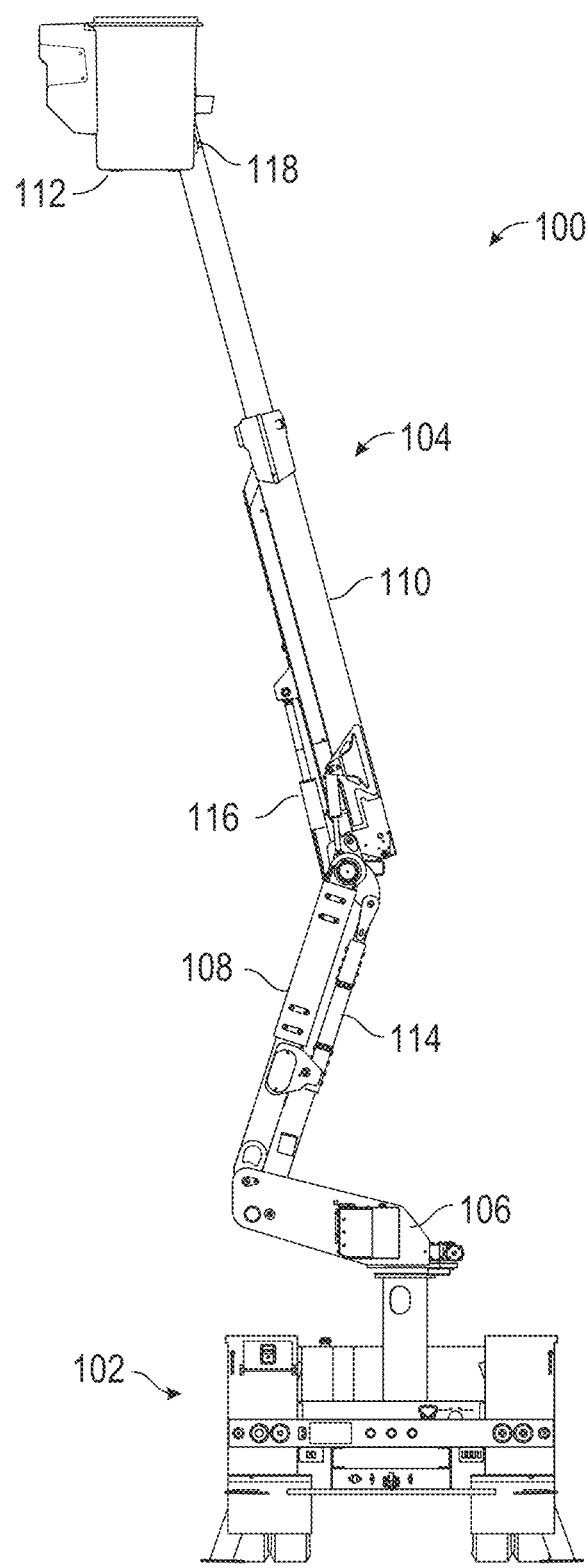
FIG. 1 depicts an aerial device relating to some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the current disclosure relate to systems and methods for controlling motion of remotely operated equipment in real-time based on control signals from one or more input devices. In some embodiments, a control signal is received from an operator indicative of an updated target position for the remotely operated equipment. Accordingly, a motion path may be generated for the remotely operated equipment based on the updated target position, as well as the current position and dimensions of the remotely operated equipment.

Typical remotely control systems rely on a series of complex individual movement inputs from an operator that are not intuitive. For example, an operator may control various joints of a boom assembly by providing movement inputs for each individual joint separately. This control process is exceedingly difficult and requires a lot of time to master. Embodiments of the current disclosure provide a more intuitive approach such that a plurality of joints of remotely operated equipment may be moved based on a single movement input. For example, while controlling a boom assembly the operator may request to move the boom tip to the left and upwards using at least one input device such as a joystick. This movement operation requires a series of movements of the individual boom portions and joints. However, embodiments of the current disclosure contemplate a means to receive a simple movement input and automatically determine the complex motion of the individual joints that will result in the requested simple movement input. Accordingly, the operator may request the left and upward movement without considering the individual motion of each joint.

FIG. 1 depicts an aerial device 100 relating to some embodiments. Aerial device 100 may be attached to utility vehicle 102, as shown. In some embodiments, aerial device 100 comprises a boom assembly 104 and a turntable 106 that may be disposed on utility vehicle 102, as shown. The boom assembly 104 may comprise a lower boom section 108 attached to the turntable 106 and an upper boom section 110 pivotably attached to an end of the lower boom section 108, as shown. In some embodiments, either or both of the lower boom section 108 and the upper boom section 110 may include a telescoping portion for telescopically extending and retracting the length of the boom assembly 104. Further, in some embodiments, a utility platform 112 may be included, attached at a distal end of the upper boom section 110, as shown. Alternatively, or additionally, in some embodiments, a robotic assembly may be disposed at the distal end of the upper boom section 110, as will be described in further detail below.

In some embodiments, the aerial device 100 may be used for performing work on or near high-voltage power lines. As such, the aerial device 100 may be operated near electrically powered high-voltage cables. In some embodiments, utility platform 112 and boom assembly 104 comprise insulating material for electrically insulating aerial device 100. Furthermore, any electrical components disposed in the utility platform and on boom assembly 104 may be self-contained and separate from the electrical components of utility vehicle 102. As such, a dielectric gap is created between utility platform 112 and utility vehicle 102. In some embodiments, utility vehicle 102 may generally be referred to as a base, and may be any of a vehicle, a crane, a platform, a truck bed, a mechanical tree trimming apparatus, a hydraulic lift, or any other base capable of supporting boom assembly 104 and utility platform 112, as will be described in further detail below.

In some embodiments, the boom assembly comprises one or more cylinders for controlling motion of the boom assembly 104 such as a lower boom cylinder 114 disposed between the turntable 106 and the lower boom section 108 and an upper boom cylinder 116 disposed between the lower boom section 108 and the upper boom section 110, as shown. In some embodiments, the cylinders 114 and 116 may be actuated hydraulically using a hydraulics system of the boom assembly 104. However, embodiments are contemplated in which other suitable actuation techniques may be employed to actuate the cylinders 114 and 116 such as, for example, electrical actuation, pneumatic actuation, and magnetic actuation. Further, in some embodiments, a combination of different actuation techniques may be used. Embodiments are contemplated in which the boom assembly 104 comprises one or more rotary actuators. For example, in some embodiments, the boom assembly 104 comprises a slew drive for controlling rotation of a respective joint of the boom assembly 104.

In some embodiments, the lower boom cylinder 114 may control the angle of rotation of the lower boom section 108 relative to the turntable 106. Similarly, the upper boom cylinder 116 may control the angle of rotation of the upper boom section 110 relative to the lower boom section 108. Additionally, in some embodiments, a pivotable connection 118 may be included between the distal end of the upper boom section 110 and the utility platform 112 for controlling the angle of the utility platform 112. In some such embodiments, the pivotable connection 118 may be configured to automatically maintain an upright orientation of the utility platform 112. For example, the pivotable connection 118 may include one or more gyroscopes and/or interface with a control system for maintaining the upright orientation of utility platform 112 such that the utility platform 112 is held in an upright position regardless of the orientation of the rest of the boom assembly 104. Additionally, or in the alternative, embodiments are contemplated in which the orientation of the utility platform 112 may be controlled manually by an operator using one or more input devices.

Figure 2:
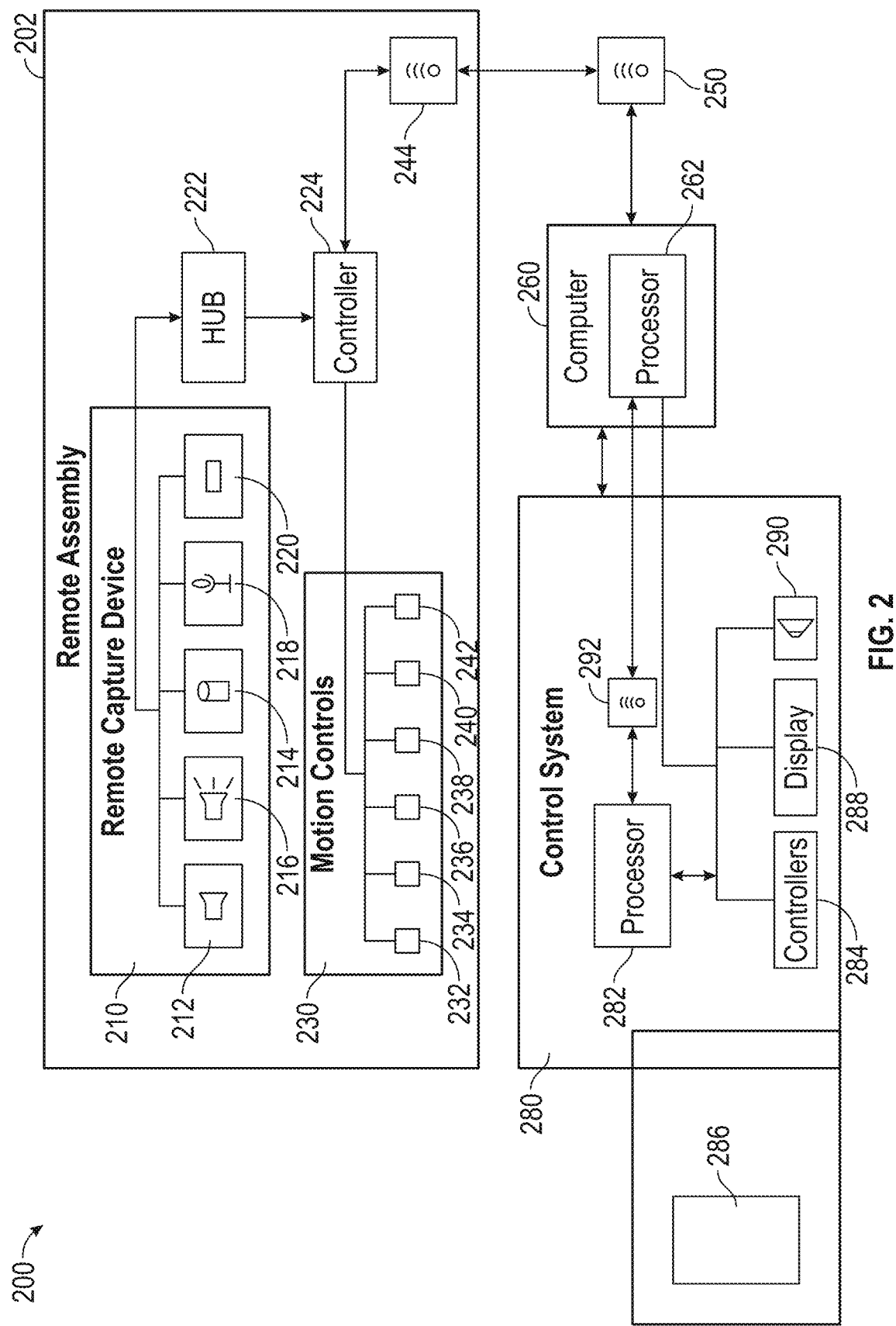
FIG. 2 depicts an exemplary system architecture of a robot unit and manual controls relating to some embodiments.

FIG. 2 depicts an exemplary block diagram 200 related to embodiments of the present disclosure. In some embodiments, the remote assembly system 300 comprises various assemblies, sub-assemblies, parts, or components for capturing sensory information and/or for performing actions, such as repair work in a telecommunication setting. The remote assembly system 300 may comprise various circuitry, parts, or other components for capturing sensory information, including video, three-dimensional depth information, audio, and other sensory data. Further, the remote assembly system 300 may comprise a manually controlled or autonomous robot unit that may be positioned at the end of the boom assembly 104 for interacting with a work site to perform one or more task. For example, as described above, in many real-life scenarios, tasks to be performed may not be discovered until reaching the job site, and accordingly, the robot unit may comprise a variety of tools, features, or functions to respond to a variety of different tasks. Additionally, as described in greater detail below, remote robot assembly may further comprise one or more parts, components, or features for providing an operator with sensory information, providing the operator with additional information about the job site to improve efficiency, efficacy, and/or safety of both the remote assembly system 300 and the operator.

As depicted in the block diagram 200, a remote robot assembly 202 comprises at least a remote capture device 210, a computer 260, and a control system 280. In some embodiments, and as described in greater detail herein, the remote capture device 210 may be a device configured and adapted for the capturing of sensory information and may be positioned on a robot unit for the capturing of sensory information that may be utilized by computer 260, to present information to an operator via control system, among other purposes. FIG. 2 depicts exemplary sensors, cameras, and other apparatuses that may be utilized by remote capture device 210 for the capturing of sensory information. As described in greater detail below, remote capture device 210 may be mounted or positioned on a selectively movable mount or portion of a robot unit. For example, the robot unit may be a robot unit positioned at the end of a boom assembly for aerial application. However, remote capture device 210 may also be used with a robot unit that is not attached on a boom assembly, and for example, may be utilized with a robot unit for ground application or attached to a mechanical arm or an aerial drone. Accordingly, via the robot unit, sensory information may be captured by remote capture device 210.

Through selective inputs, including both manually inputted instructions and/or automated instructions, remote capture device 210 may capture video, still images, three-dimensional depth information, audio, electrical conductivity, voltage, among other information that may be captured by a sensor or recording device. For example, remote capture device 210 may comprise at least one camera 212 for the capturing of video or still images (collectively, "video"). The at least one camera 212 may be a camera positioned on remote capture device 210 for the capturing of video within a selected field of view. The resolution of the video captured by camera 212 may vary, but in some embodiments, camera 212 may be a camera configured for capturing in at least 720p resolution but may capture in higher resolution including but not limited to 1080p, 2K, 4K, or 8K resolution. However, it will be appreciated that the camera 212 may be any currently known or yet to be discovered camera for capturing video. Video captured from camera 212 may be stored locally at remote capture device at a local memory 214. Local memory 214 may be any of the storage or memory described below with respect to FIG. 9. The storing of video at local memory 214 may aid in providing a failsafe or backup storage of captured video in the event of a transmission or upload failure. Further, the storing of video at local memory 214 may aid in situations of poor wireless connection or if a direct line becomes loos or interrupted, preventing the immediate transmission of captured video. Optionally or additionally, video captured from camera 212 may be transmitted to computer 260 for processing, analyzing, storage, and/or for later transmitting to control system 280. In further embodiments, video captured from camera 212 may be directly transmitted to control system 280 for processing.

In some embodiments, remote capture device 210 may further comprise at least one three-dimensional camera 216 or other device configured for capturing three-dimensional depth information. As described in greater detail below, the three-dimensional depth camera 216 may be utilized for capturing three-dimensional depth information within a field of view for creating a point cloud, 3-D model, or other digital representation of an object or area scanned or viewed by the three-dimensional camera 216. Three-dimensional camera 216 may be operated in conjunction with, or independent from camera 212 or other components or parts of remote assembly 202 and/or remote capture device 210. As described in greater detail below, in response to instructions or an input, three-dimensional camera 216 may begin capturing three-dimensional depth information about an object or area within a field of view. Like the captured video with respect to camera 212, the three-dimensional depth information captured by three-dimensional camera 216 may be saved locally at memory 214. In some embodiments, remote capture device 210 may comprise a separate memory 214 for video captured by camera 212 and a separate memory 214 for three-dimensional information captured by three-dimensional camera 216. As described in greater detail below, remote capture device 210 may comprise a microphone 218 and/or at least one sensor 220 for capturing additional sensory information. Accordingly, in some embodiments, a separate and distinct memory 214 may be used for each sensory capture device (i.e., camera 212, three-dimensional camera 216, microphone 218, and/or sensor 220). In further embodiments, remote capture device 210 may comprise a single memory 214 for the storing of all captured sensory information. As described above and in further embodiments, three-dimensional information may be directly sent to computer 260 in addition to or instead of storing locally at memory 214.

In addition to capturing video and/or three-dimensional information, it may also be advantageous for remote capture device 210 to capture additional sensory information that may be presented to an operator or processed by computer 260. For example, in certain scenarios it may be advantageous for remote capture device 210 to capture audio via at least one microphone 218. Continuing with the running example, a remote assembly 202 for use with telecommunications repair may utilize audio information for diagnostic or safety purposes. For example, audio information may capture the sounds of the job site and the audio information may be processed to determine if a job site is safe. Accordingly, in some embodiments, remote capture device 210 may comprise at least one microphone 218 for the capturing of audio information. Similar to the video and three-dimensional information as described above, captured audio information may be stored locally at a memory 214 and/or transmitted to a computer 260 and/or control system 280.

Similar to audio information, remote capture device 210 may further comprise one or more sensors 220 for the capturing of additional sensory information, metrics, or data. For example, continuing with the running example, the remote capture device 210 may be used with a remote assembly 202 positioned at the end of boom assembly 104 for telecommunication or powerline work. In such a work application, the remote assembly 202 may be working on or near live powerline or other conductive lines transferring electricity. Accordingly, in some embodiments, remote capture device 210 may comprise at least one sensor 220 configured as an electricity sensor for determining whether a cable or powerline has electricity running through it. However, it will be appreciated that remote capture device 210 may comprise additional sensors 220 configured and adapted for providing remote capture device and/or remote assembly 202 with additional information. By way of non-limiting example, sensor 220 may comprise any of the following sensors: a gyroscope, an accelerometer, a thermometer, a barometer, a light emitter, among other sensors that may be utilized in the intended application of remote assembly 202.

In some embodiments, the remote assembly 202 may further comprise at least one digital Hub 220. In some embodiments, the remote assembly 202 further comprises at least one digital Hub 222. The digital Hub 22 may receive the captured sensory information from remote capture device and convert the captured sensory information into a format suitable for transmitting to computer 260 and/or control system 280. In some embodiments, the digital Hub 222 is a USB Hub, such as, for example, a USB 3.0.

As further depicted in FIG. 2, remote assembly 202 may further comprise a controller 224. In some embodiments, controller 224 may be a processor or other circuitry or computer hardware for receiving commands or instructions from control system 280 and/or computer 260 and for relaying or providing commands to remote capture device 210 and/or motion controls 230. Accordingly, in some embodiments, instructions or commands from controller 224 may be sent to remote capture device 210. For example, instructions sent from controller 224 to remote capture device 210 may include instructions to begin recording video via camera 212. However, it will be appreciated that instructions sent from controller 224 may cause any of the components of remote capture device 210 to begin capturing sensory information, including but not limited to three-dimensional information, audio information, or other sensory information captured by any of the sensors 220 of remote capture device 210. Additionally, controller 224 may be used to send instructions to cause remote assembly 202, remote capture device 210, and/or motion controls 230 to perform other actions corresponding to the instructions. For example, instructions from controller 224 may instruct remote capture device 210 to store captured sensory information on memory 214. Additionally, instructions from controller 224 may be sent to motion controls 230 to instruct remote assembly 202 to perform a movement. Further, controller 224 may be in communication with transceiver 244 for communicating with computer 260 and/or control system 280 to send sensory information or other data or information to computer 260 and/or control system 280. Similarly, controller 224 may further be configured for receiving instructions, commands, or other information from computer 260 and/or control system 280.

As further depicted in the block diagram of FIG. 2 and in some embodiments, remote assembly 202 may further comprise motion controls 230. Motion controls 230 may be configured and adapted for controlling the movement of remote assembly 202, including any utility arms or camera mounts as described in greater detail below. In some embodiments, remote assembly 202 may comprise a 6 DOF robot unit configured with utility arms and/or camera mounts that can move with 6 DOF. Accordingly, motion controls 230 may be configured to provide instructions or commands to remote assembly 202 to move in 6 DOF. In some embodiments, motion controls may comprise x-axis control 232, y-axis control 234, z-axis control 236, pitch control 238, yaw control 240, and/or roll control 242 for moving remote assembly 202 with 6 DOF. It will be appreciated however, that remote assembly 202 may comprise varying designs, and in some embodiments, may move in fewer than 6 DOF. Accordingly, in further embodiments, motion controls 230 may comprise controls configured and adapted for moving remote assembly 202 in an appropriate number of planes.

As described above, motion controls 230 may be in communication with controller 224. Instructions or commands from controller 224 may be sent to motion controls 230. Upon receipt of the instructions, the corresponding controls 232, 234, 236, 238, 240, and/or 242 may be instructed to cause movement of the remote assembly 202 based on the received instructions. As described above, one or more arms or limbs of remote assembly 202 may be configured to move with 6 DOF. Based on the instructions, the corresponding motion controls 230 may cause movement of the remote assembly 202 to correspond to the instructions.

As described above, remote assembly 202 may be communicatively coupled to computer 260. In some embodiments, computer 260 may be directly coupled to remote assembly 202, such that computer 260 and remote assembly 202 are a combined system. For example, computer 260 may be directly installed into a frame or body of remote assembly 202. Accordingly, remote assembly 202 and computer 260 may be in direct communication through cables or other direct methods. In further embodiments, computer 260 may be located external to remote assembly 202. When located externally, remote assembly 202 and computer 260 may nevertheless be communicatively coupled. For example, in some embodiments, remote assembly 202 and computer 260 may be coupled through a physical connection such as an Ethernet cable or USB cable. In further embodiments, remote assembly 202 and computer 260 may be coupled through a wireless connection, such as WiFi, Bluetooth®, cellular connection, or another wireless connection. In embodiments in which computer 260 and remote assembly 202 are connected through a wireless connection, transceiver 244 may communicate with another transceiver 250 coupled or otherwise in communication with computer 260.

In some embodiments, computer 260 may receive and process sensory information captured by remote capture device 210 of remote assembly 202. Accordingly, computer 260 may comprise at least a processor 262 for executing commands, which may include instructions for processing, analyzing, or utilizing captured sensory information. For example, as described in greater detail below, computer 260 may utilize captured three-dimensional information to generate a point-cloud, three-dimensional model, or other digital representation of an object or area captured by remote capture device 210.

In some embodiments, control system 280 may be an interface, apparatus, or system providing a user with an interactive medium for interacting with computer 260 and/or remote assembly 202. For example, in some embodiments, control system 280 may comprise at least a processor 282, at least one controller 284, at least one display 288, at least one sensor 290, and at least one transceiver 292. As described in greater detail below, some embodiments of the present teachings provide for a method of controlling remote assembly 202 from a remote location. Continuing with the running example, oftentimes telecommunications repair or powerline repair sometimes occur during or immediately after a severe weather storm. This type of scenario can be wrought with dangers such as exposed and live powerlines, high winds, lightning, and other dangers that pose a risk to human workers. Accordingly, it may be advantageous for an operator of remote assembly 202 to control remote assembly 202 in a safe location, such as in a work truck or building away from the job site. Accordingly, control system 280 may comprise at least one interfacing controller 284, providing an interactive means for a user to input commands or instructions for controlling or manipulating remote assembly 202. Controller 284 may be any interface for inputting commands or instructions that can be transmitted and processed by a computer or other hardware. Exemplary embodiments of controller 284 are provided below with respect to FIG. 4, however, it will be appreciated that the depicted embodiments are intended to be illustrative, rather than limiting. By way of non-limiting example, controller 284 may comprise hand-held motion control controllers. As described in greater detail below, the motion control controllers may be beneficial for an operator to perform specific movements or actions that can be captured and relayed to remote assembly 202 to perform. Through the use of motion-control controllers, an operator may be provided with a sensory effect similar to being at the job site and performing the actions themselves. However, controller 284 is not limited to motion controls and instead, controller 284 may be any interface for an operator to input instructions or commands for remote assembly 202. For example, in further embodiments, controller 284 may be a handheld controller, similar to that of a video game controller comprising thumbsticks, buttons, triggers, and/or other interfacing inputs. In further embodiments, controller 284 may comprise a joystick and button design. In even further embodiments, controller 284 may be a mouse and keyboard. In even further embodiments, controller 284 may be configured as a glove or interactive model of a hand, allowing an operator to perform native hand manipulations which may be captured and transmitted to remote assembly 202. In even further embodiments, controller 284 may comprise a camera component or other motion capture component for capturing the movement of an operator. For example, in addition to, or in place of a physical controller handled by the operator, a camera component may capture the movement of the operator. The captured movement may be transmitted to computer 260 for translation or mapping movement of remote assembly 202. Optionally, or additionally, motion capture aids, such as motion capture dots, may also be used for capturing movement of the operator. In some embodiments, may It will be appreciated that the examples provided herein are intended to be illustrative, rather than limiting, and that controller 284 may be any apparatus or method of receiving instructions or an input from an operator.

In some embodiments, control system 280 may further comprise a power medium 286 for powering one or more parts or components of control system, including for example controller 284, display 288, or the at least one sensor 290, or any combination thereof. In some embodiments, a single power medium may power all parts or components of control system 280. In further embodiments, individual parts or components of control system 280 may comprise a separate and distinct power medium 286. For example, a first power medium 286 may be used for powering controller 284 and a second power medium 286 may be used for powering display 288. Power medium 286 may be any conventionally known power source for providing power to an electrical device, including but not limited to an internal power source such as a battery, or an external battery source such as an electrical outlet.

As further depicted in FIG. 2, control system 280 may further comprise at least one display 288. In some embodiments, display 288 may be a monitor, touchscreen, television screen, or other display with reference to FIG. 9 below. In some embodiments, at least a portion of the captured sensory information from remote capture device 210 may be displayed on display 288 for an operator to view. For example, captured video may be displayed on display 288. Providing sensory information on display 288 may provide an operator with a more immersive feel when remotely operating remote assembly 202. Through a real-time video feed, an operator may experience the job site as if the operator was physically present, even if the operator is in a safe location miles away. Additionally, providing sensory information to an operator via display 288 may aid the operator in inputting instructions or commands via controller 284.

In some embodiments, control system 280 may further comprise at least one sensor 290, which may provide additional sensory affect to the operator and/or capture additional inputs that may be used by computer 260 to provide instructions to remote assembly system 300. In some embodiments, one or more sensors may be combined with controller 284 and/or one or more sensors may be combined with display 288. For example, in some embodiments, sensor 290 may be at least one speaker or sound emitting device to provide the operator with audio information captured from remote capture device 210 or pre-recorded or pre-rendered audio. In further embodiments, the at least one sensor 290 may be one of an accelerometer, a gyroscope, a light sensor, or any other type of sensor 290 suitable to detect the viewing angle of the user or the movement, position, or angle of the operator's body.

In some embodiments, and as described in greater detail below, an operator may utilize controller 284, display 288, and the at least one sensor 290 to provide instructions to remote assembly 202, which may be analyzed and translated into instructions to cause remote assembly 202 to move or perform an action. As also described in greater detail below, an operator may input instructions or commands through control system 280. In some embodiments, inputs may be inputted or captured by a combination of controller 284 and display 288. For example, display 288 may be coupled to a head-mounted unit as described in greater detail below. An operator may move their head or torso with sensor 290 capturing the movement and/or viewing angle of the operator. The captured movement data or viewing angle may be sent to computer 260 via transceiver 292, and computer 260 may take the captured movement data or viewing angle and translate into instructions for causing remote assembly 202 to move and mimic or replicate the operator's movement and match the viewing angle of the operator.

Figure 3:
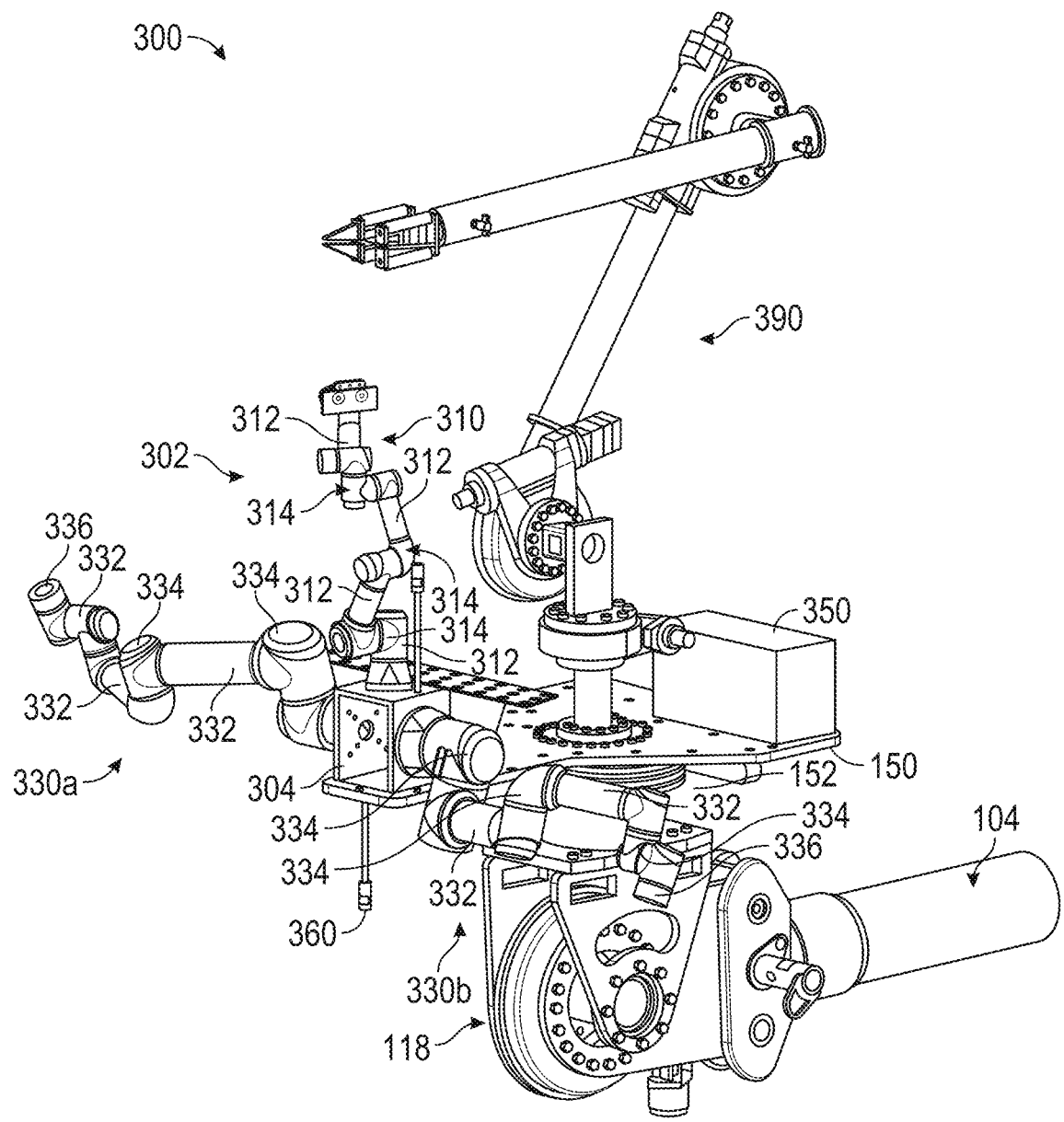
FIG. 3 depicts a six-degree-of-freedom robot unit relating to some embodiments.

FIG. 3 is an exemplary embodiment of a remote assembly system 300. In some embodiments, the remote assembly system 300 may comprise various assemblies, sub-assemblies, parts, or components, including but not limited to a robot unit 302 affixed at the end of a boom assembly 104. Further, the remote assembly system 300 may correspond to the remote assembly 202 as described above with respect to FIG. 2 and may comprise any and all of the components or parts as described above. In some embodiments, robot unit 302 may be configured and adapted to receive instructions from a computer or operator to perform a corresponding movement or action. In some embodiments, robot unit 302 may be a fully manually controlled robot, wherein the robot unit 302 will not perform a movement or action absent an instruction provided from an operator. In further embodiments, robot unit 302 may be fully a fully automated robot, wherein the robot unit 302 performs actions or movements based on pre-programmed instructions for automation. In even further embodiments, robot unit 302 may be a robot configured to respond to both manually inputted instructions and automated programming. Accordingly, the various movements or actions performed by robot unit 302 and described herein may be performed based on manually provided instructions and/or automated programming.

As described above and as illustrated in FIG. 3, in some embodiments, remote assembly system 300 may be positioned at the distal end of boom assembly 104. As depicted, in some embodiments, distal end of boom assembly 104 may comprise a pivot joint comprising a motor. In some embodiments, pivot joint may be used to change an angle or position of remote assembly system 300. In further embodiments, pivot joint may be paired with a sensor, such as a gyroscope, to aid in maintaining a leveled position of remote assembly system 300. As further depicted in FIG. 3, pivot joint may further act as an attachment point between remote assembly system 300 and boom assembly 104. For example, a base may be coupled to pivot joint. Base may be adapted and configured for receiving and coupling remote assembly system 300. Accordingly, through such coupling, remote assembly system 300 may be secured and attached to boom assembly 104. In some embodiments, base may comprise a generally planar design for accepting and securing one or more assemblies, sub-assemblies, parts, or components of remote assembly system 300. Further, the size and shape of base may vary, and may be dependent on design of remote assembly system 300. Further, in some embodiments, base may further comprise a motorized turntable 106. Motorized turntable 106 may be a power motor train system for rotating base. The rotation of base may be advantageous for positioning remote assembly system 300 during use.

In some embodiments, remote assembly system 300 may generally comprise a robot unit 302. Robot unit 302 may be a controllable robotics unit that can perform a range of movements and actions, such as performing repair work in a telecommunication setting. In some embodiments, and as described in greater detail below, robot unit 302 may be 6 DOF robotics assembly, configured and adapted for mimicking the movement of an operator utilizing a VR controller. Particularly, through a 6-DOF configuration, robot unit 302 may substantially mimic the torso, neck, and arm movements of the operator. Through such movement, robot unit 302 may perform a greater range of movements and/or provide a more immersive experience to an operator than pre-existing systems.

In some embodiments, robot unit 302 may comprise a central hub 304. Central hub 304 may be a central housing or base, which may house a processor, a power source, circuitry, a wireless communication means among other electronics for robot unit 302, including the components described above with respect to FIG. 2. Additionally, central hub 304 may act as a coupling or attachment member, securing robot unit 302 to base. Even further, central hub 304 may also act as a receiving point for one or more parts or components of robot unit 302. For example, and as described below, robot unit 302 may comprise at least one utility arm and at least one camera mount. Accordingly, central hub 304 may receive and couple with the at least one utility arm and the at least one camera arm.

To collect sensory information, including but not limited to video and three-dimensional depth information, robot unit 302 may comprise at least one camera mount 310. Camera mount 310 may be a 6 DOF, selectively controllable robotic arm, that may couple to central hub 304. As described in greater detail below, robot unit 302 may receive movement instructions or commands from computer 260 that may cause camera mount 310 to move or change position. For example, camera mount 310 may correspond to a head mount or other capture apparatus to capture the viewing angle of an operator. Instructions or commands may be relayed to robot unit 302 causing camera mount 310 to move in a corresponding manner to match the viewing angle of the operator. To enhance the operator experience, camera mount 310 may comprise a plurality of camera mount segments 312 that may be separated by motorized pivotable joints 314. The number and size of camera mount segments and pivotable joints 314 may vary depending on the embodiments and application of robot unit. Generally, in response to an instruction or commands, one or more of the pivotable joints 314 may activate to rotate or move camera mount 310. In some embodiments, the pivotable joints 314 may be used to move camera mount 310 in the X-axis, Y-axis, Z-axis as well as control the roll, pitch, and yaw of the camera mount 310. Accordingly, through movement in the 6 DOF, camera mount 310 may mimic or replicate the viewing angle of the operator. As further depicted in FIG. 3, a distal end of camera mount 310 may further comprise a sensory capture device. In some embodiments, the sensory capture device generally comprises at least one camera, three-dimensional camera, and/or sensor for capturing sensory information.

As described above, robot unit 302 may be adapted for performing repair work, maintenance work, or other similarly situation tasks or actions. To perform these actions, robot unit 302 may comprise at least one utility arm. The depicted embodiment as illustrated in FIG. 3 illustrates an exemplary embodiment of robot unit 302 comprising two utility arms 330a, 330b. Like camera mount 310 as described above, each of utility arms 330a, 330b may comprise a plurality of utility arm segments 332 that may be separate by motorized pivotable joints 334. The number and size of utility mount segments 332 and pivotable joints 334 may vary on the embodiments and application of robot unit. Generally, in response to an instruction or commands, one or more of the pivotable joints 334 may activate to rotate or move utility arms 330a, 330b. In some embodiments, the pivotable joints 334 may be used to move utility arms 330a, 330b in the X-axis, Y-axis, Z-axis as well as control the roll, pitch, and yaw of the camera mount 310. Accordingly, through movement in the 6 DOF, each utility arm 330a, 330b may mimic or replicate the movement of an operator's arms and hands. In some embodiments, the distal ends 336 of utility arms 330a, 330b may comprise one or more tools, flanges, or other apparatus for performing an action such as repair work. In some embodiments, distal ends 336 may comprise an adapter or may be otherwise configured for accepting a tool.

Remote assembly system 300 may further comprise a remote power source 350. In some embodiments, the remote power source 350 may be secured to the base. In further embodiments, remote power source 350 may be located within central hub 304. The remote power source 350 may be used to power camera mount 310, utility arm 330a, utility arm 330b, or any combination thereof. Remote power source 350 may be an electric generator, batteries, or any other known power source.

In further embodiments, robot unit 302 may comprise one or more additional capture devices or sensors 360 for capturing additional information that may be analyzed and/or presented to a user or operator in addition to the sensors 410 as described below. For example, in some embodiments, robot unit 302 may comprise a thermometer or heat sensor for capturing heat information. In some embodiments, robot unit 302 may comprise an electrical sensor for capturing electrical data. For example, robot unit 302 may be used to work on power lines or in other scenarios involving live power lines or other electrically charged wires or circuitry. accordingly, to avoid damage to the robot unit 302, the boom assembly 104, or the utility vehicle 102, at least one sensor 360 may be a sensor for detecting an electrical current. Additionally, robot unit 302 may comprise at least one sensor 360 that is at least one of an accelerometer, gyroscope, light sensor, or other sensor for detecting the positioning of camera mount 310, utility arm 330a, and/or utility arm 330b. As described in greater detail below, a sensor for detecting the positioning of robot unit 302 may aid in replicating or mimicking movement of an operator using motion controls.

In some embodiments, and as depicted in FIG. 3, in addition to robot unit 302, boom assembly and remote assembly system 300 may further comprise at least one heavy utility arm 390 or additional robotics assembly that may operate separately or in conjunction with robot unit 302. For example, in many robotics applications, a delicate balance is often considered when designing the features and capabilities of a robot. Typically, robotics adapted and configured for delicate work and fine adjustments are typically not capable of transporting or holding heavy loads. Conversely, robotics adapted and configured for holding or transporting heavy loads typically lack the structural components to perform delicate or fine-tuned actions. By way of non-limiting example, in telecommunication repairs, heavy parts may need to be lifted from the ground to a telecommunication pole. Lifting a heavy part may require a robotics configured for transporting heavy loads. However, once in position, the part may need a robotics configured for delicate or sophisticated operations to install the part in position. Embodiments of the present disclosure solve this dilemma by pairing a robotics configured and adapted for fine tuning and/or delicate work with a robotics configured and adapted for load bearing or transporting heavy loads. For example, in some embodiments, robot unit 302 may be configured and adapted for performing movements or actions directed to sophisticated, delicate, or fine-tuning work, such as unthreading wire, cutting wire, loosening screws and bolts. In some embodiments, 300 may comprise a at least one utility arm 390 for holding or transporting heavy loads that may be too heavy for robot unit 302 to safely hold and transport. Accordingly, through the combination of robot unit 302 and utility arm 390, remote assembly system 300 may perform both dexterous actions and load-bearing actions.

Figure 4:
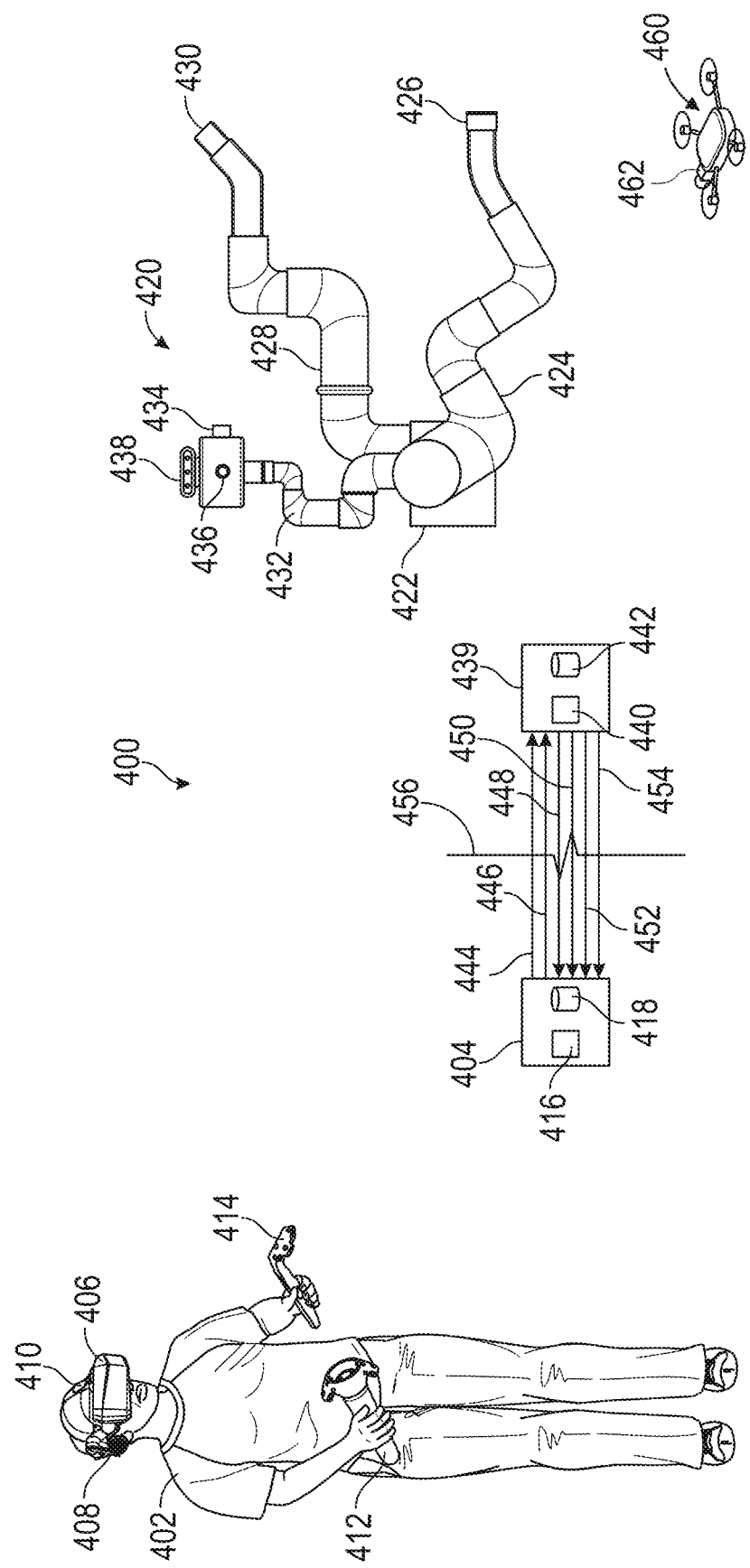
FIG. 4 depicts an exemplary remote operation system relating to some embodiments.

FIG. 4 depicts an exemplary remote operation system 400 relating to some embodiments. In some such embodiments, an operator 402 may be equipped with at least one user device 404. In some embodiments, the user device 404 comprises a computer or other computing device. The user device 404 may comprise or be associated with a head-mounted display such as a virtual reality headset or the like. In some embodiments, the user device 404 includes or interfaces with at least one display 406 and one or more speakers 408, as shown. For example, the display 406 may be disposed on a front of the headset and the speakers 408 may be positioned on either side of the headset such that stereophonic audio may be provided. Additionally, in some embodiments, the user device 404 may include at least one sensor 410 disposed on or in the user device 404. For example, in some embodiments, the at least one sensor 410 may include any combination of accelerometers, gyroscopes, or angular position sensors for measuring an angle or change in angular position of the user device 404.

In some embodiments, the user device 404 may further include one or more controllers such as a first position sensitive controller 412 and a second position sensitive controller 414, as shown. In some embodiments, each of the first position sensitive controller 412 and the second position sensitive controller 414 may be configured to be held in the hands of the operator 402 for reading the position of the hands of the operator 402. In some such embodiments, the first position sensitive controller 412 and the second position sensitive controller 414 may incorporate one or more position sensitive sensors, such as any of accelerometers, gyroscopes, potentiometers, load cells, as well as other sensors suitable to measure the position and angular position of the hands of the operator 402. In some embodiments, the user device 404 comprises any number of joysticks such as any combination of single-axis or multi-axis joysticks. For example, one or more 3-axis joysticks or 6-axis joysticks may be used to control motion of either of the robotic assembly 420 or the boom assembly 104. In some embodiments, a 6-axis joystick may be used to control motion in six degrees of freedom. For example, in some embodiments, the position sensitive controllers 412 and 414 may include a 6-axis joystick or other multi-axis control means.

In some embodiments, the user device 404 interfaces with or includes at least one processor 416 and at least one data storage 418. For example, in some embodiments, the processor 416 and data storage 418 may be internally or externally included on the user device 404. Additionally, embodiments are contemplated in which the processor 416 and data storage 418 may be included externally on another device that interfaces with the user device 404. For example, an external computer may interface with the user device 404 via either of a wired or wireless connection.

In some embodiments, the remote operation system 400 includes a robotic assembly 420, as shown, that may interface with the user device 404. In some embodiments, the robotic assembly 420 comprises a base 422, as shown. In some embodiments, the robotic assembly 420 may be disposed at the distal end of the upper boom section 110 in place of or in addition to the utility platform 112. For example, in some embodiments, the base 422 of the robotic assembly 420 may be pivotably secured to a boom tip of the boom assembly 104. The robotic assembly 420 may include one or more robotic arms. For example, in some embodiments, the robotic assembly 420 comprises a first robotic arm 424 including a first robotic arm end 426 and a second robotic arm 428 including a second robotic arm end 430, as shown. Embodiments are contemplated in which the robotic arms 424 and 428 include any number of sensors for measuring the position and angle of one or more joints within each robotic arm. Accordingly, information may be monitored related to the position and orientation of the robotic arms in 3-dimensional space.

Additionally, in some embodiments, the robotic assembly 420 comprises a camera robotic arm 432 including one or more cameras 434 and one or more microphones 436 disposed at an end of the camera robotic arm 432. In some embodiments, two or more cameras 434 may be included to provide stereoscopic vision, which may improve visual depth. Similarly, two or more microphones 436 may be included to provide stereophonic audio. In some embodiments, the cameras 434 and the microphones 436 may be configured to continuously capture video data and audio data respectively. Further, in some embodiments, the camera robotic arm 432 is configured to rotate and/or pivot about one or more joints to adjust the positioning and angle of the cameras 434 and the microphones 436.

In some embodiments, the robotic assembly 420 includes a depth sensor 438 disposed, for example, at the end of the camera robotic arm 432, as shown. The depth sensor 438 may be configured to collect 3-dimensional range information in proximity to the robotic assembly 420. In some such embodiments, the depth sensor 438 is operable to collect a 3-dimensional scan of a work area associated with the robotic assembly 420. Additionally, in some embodiments, the depth sensor 438 collects information relating to the positioning of the robotic arms. Further, in some embodiments, the depth sensor 438 may be used for object identification, for example, to prevent unintentional collisions of the robotic assembly 420 with foreign objects. In some embodiments, the depth sensor 438 may be a lidar sensor or other type of depth sensor. Further still, embodiments are contemplated in which a plurality of depth sensors 438 may be included. For example, an array of lidar sensors may be disposed around the robotic assembly 420 to capture a 3-dimensional scan of the work area. Additionally, in some embodiments, both of a front facing lidar sensor and a rear facing lidar sensor may be included to generate a 3-dimensional scan of the areas ahead of and behind the robotic assembly 420 respectively.

In some embodiments, the robotic assembly 420 interfaces with or includes a computing device 439 such as a computer or controller. The computing device 439 may include at least one processor 440 and at least one data storage 442, as shown. For example, in some embodiments, the computing device 439 may be included internally or externally on the robotic assembly 420. Additionally, embodiments are contemplated in which the computing device 439 may be included as an external computing device interfaced with the robotic assembly 420. Such an external computing device may be disposed, for example, in the vicinity of the robotic assembly 420 or elsewhere such as near the user device 404. Accordingly, embodiments are contemplated in which signal processing takes place at the robotic assembly 420, at the user device 404, or any combination thereof.

In some embodiments, a bidirectional communication connection may be established between the user device 404 and the robotic assembly 420. In some embodiments, the robotic assembly 420 and the user device 404 may be communicatively coupled via any of a non-electric wired connection such as a fiber optic cable, or a wireless connection such as a wireless network connection or Bluetooth connection. Embodiments are contemplated in which an electrical wired connection may be used such as a traditional electrical cable, however, it may be unsafe to use an electrical communication connection while the aerial device is electrically bonded to an energized power line. As such, in some embodiments, in which electrical bonding is used, alternative communication connections are used. In some embodiments, a plurality of data signals may be transmitted from the user device 404 to the robotic assembly 420 and vice versa. For example, in some embodiments, a controller signal 444 including information indicative of the position and orientation of the first position sensitive controller 412 and/or the second position sensitive controller 414 may be transmitted from the user device 404 to the robotic assembly 420. Similarly, a sensor signal 446 including information indicative of the position and orientation of the at least one sensor 410 may be transmitted from the user device 404 to the robotic assembly 420.

Additionally, in some embodiments, data signals may be transmitted from the robotic assembly 420 to the user device 404. For example, a video data 448 including images captured by the cameras 434 may be transmitted from the robotic assembly 420 to the user device 404. Similarly, audio data 450 including audio captured by the microphones 436 may be transmitted from the robotic assembly 420 to the user device 404. Further, in some embodiments, scan data 452 including information indicative of the 3-dimensional data and/or distance data captured by the depth sensor 438 may be transmitted from the robotic assembly 420 to the user device 404. In some embodiments, computer-vision techniques may be applied to the image data and/or the depth data, for example, to identify one or more objects within the work area of the remotely operated equipment.

In some embodiments, a feedback signal 454 may be transmitted from the robotic assembly 420 to the user device 404. In some such embodiments, the feedback signal 454 may include haptic feedback or some other notification from the robotic assembly 420. For example, in some embodiments, the feedback signal 454 may include instructions to cause either of the first position sensitive controller 412 or the second position sensitive controller 414 to vibrate or generate force feedback for the operator 402 responsive to a collision or a potential collision condition. Further still, embodiments are contemplated in which the feedback signal 454 causes any of vibration or force feedback within the first position sensitive controller 412 and/or second position sensitive controller 414, audible feedback within the one or more speakers 408 such as a ringing alarm, visual feedback within the least one display 406 such as a flashing light, or any combination thereof. In some embodiments, the feedback signal 454 may be transmitted based on one or more triggers. For example, a trigger may be generated when the robotic assembly 420 is approaching a collision or a singularity. In some embodiments, any of the data signals described above may be submitted in real-time. For example, the video data 448 and the audio data 450 may be continuously provided from the robotic assembly 420 such that the image data captured by the cameras 434 is displayed on the displays 406 in real-time with minimal latency.

In some embodiments, one or more of the signals described herein may be transmitted across a dielectric gap 456. In some embodiments, the user device 404 may be disposed at a remote location with a different voltage potential from that of the robotic assembly 420. For example, the robotic assembly 420 may be electrically bonded to an energized power line for performing work on or in the vicinity of the energized power line. Accordingly, the robotic assembly 420 is held at a similar electrical potential as the energized power line and is insulated from coming into contact with ground potential. Accordingly, in some embodiments, traditional electrical communication techniques may be avoided to prevent electric shock. As such, embodiments are contemplated in which a fiber optic cable or wireless connection are used for communication with the robotic assembly 420 to prevent electrical signals at ground potential from reaching the robotic assembly 420.

In some embodiments, at least one drone 460 may be included. For example, drones or other autonomous vehicles may be positioned around the work area of the robotic assembly 420. In some such embodiments, the drone 460 may include at least one sensor 462 such as a camera or lidar sensor for capturing additional information about the work area. In some embodiments, the at least one sensor 462 comprises any combination of one or more cameras and one or more lidar sensors. For example, in some embodiments, a drone 460 may hover around a back side of a utility pole to capture additional image data that is not otherwise visible to the robotic assembly. Additionally, in some embodiments, the drone 460 may include a lidar sensor for capturing 3-dimensional data of the work area. In some embodiments, the drone 460 may communicate with any of the robotic assembly 420 or the user device 404 via wired or wireless communication. In some embodiments, image data captured by the drone 460 may be transmitted to the user device 404.

In some embodiments, the robotic arms 424 and 428 may be configured to move based on the motion of the position sensitive controllers 412 and 414. For example, in some embodiments, the end of each robotic arm is positioned relative to the position of the position sensitive controllers such that the first robotic arm end 426 is positioned based on the position of the first position sensitive controller 412 and the second robotic arm end 430 is positioned based on the position of the second position sensitive controller 414. Accordingly, if the operator 402 moves the first position sensitive controller 412 upwards the first robotic arm 424 will automatically be adjusted such that the first robotic arm end 426 is also moved upwards. In some embodiments, the robotic arms may be adjusted by pivoting about one or more joints disposed within the robotic arms. Similarly, in some embodiments, the camera robotic arm 432 may be moved such that the camera 434 disposed at the end of the camera robotic arm 432 is positioned based on the position of the headset of the user device 404. For example, as the operator 402 moves and tilts their head, the camera robotic arm 432 will be moved and tilted such that the position of the cameras 434 matches the position of the operator's eyes.

In some embodiments, the position of the robotic assembly 420 may be shifted relative to the position of the operator 402. For example, in some embodiments, the operator 402 may temporarily freeze motion of the robotic assembly 420 to reset a home position of the robotic assembly 420. Accordingly, the operator 402 may pause the robotic assembly 420 preventing unintended motion and locking the robotic assembly 420 in place, move their arms into a more comfortable position, and then resume operation, for example, by submitting a subsequent resume input, and continue to control motion of the robotic assembly 420 from a more comfortable position. Here, the operator 402 may position their arms comfortably at a low position while the robotic arms 424 and 428 are raised upwards rather than having to hold their arms at an uncomfortably raised position for an extended period of time. Further, embodiments are contemplated in which the operator 402 controls motion of the robotic assembly 420 from a sitting position in a remote location, such as in an office chair, in a vehicle seat, or in another location remote from the robotic assembly 420. In some embodiments, requests to pause and resume motion of the robotic assembly may be received as operator inputs, for example, via the user device 404 such as through one or more buttons on the controllers 412 and/or 414.

Embodiments are discussed above in which the operator actively selects an input to pause and resume the motion control. However, it should be understood that further embodiments are contemplated in which an input such as the operator 402 pressing a button on the position sensitive controllers 412 and 414 may be used to initiate movement of the robotic assembly 420. Accordingly, in some such embodiments, the robotic assembly 420 will only move while the button is held on the respective controller. Accordingly, the operator 402 can shift the position of the motion controls by letting go of said button and moving the controllers into the desired position.

It should be understood that, in some embodiments, a variety of processing options are contemplated. For example, in some embodiments, a first processing stage may occur at or on the robotic assembly 420 such as by the processor 440 and a second processing stage may occur at the user device 404 such as by the processor 416. Here, various processing techniques may be applied to the collected signals. For example, data filtering and smoothing algorithms may be employed by the processor 440 of the robotic assembly 420 to smooth the data signals transmitted to the user device 404. Further, in some embodiments, portions of the data collected by the robotic assembly 420 may be stored within the data storage 442. Additionally, or alternatively, data processing and storage may occur at the user device 404. For example, raw data received from the robotic assembly 420 may be filtered and transformed using the processor 416 of the user device 404.

In some embodiments, the robotic assembly 420 may be disposed on the boom assembly 104. For example, the robotic assembly 420 may be included at the distal end of the boom at a boom tip of the boom assembly 104. In some embodiments, the robotic assembly 420 may be included in place of or in addition to the utility platform 112. Additionally, embodiments are contemplated in which the robotic assembly 420 may be attached to other devices such as directly onto the utility vehicle 102 or onto another suitable device not explicitly described herein. Further, in some embodiments, the robotic assembly 420 may be included as a stand-alone device.

Embodiments are contemplated in which at least a portion of the remote operation system 400 described above may be employed for controlling the motion of the boom assembly 104 of FIG. 1. For example, the joints of the boom assembly 104 may be rotated and adjusted to match the boom tip with a specified position of velocity requested by the operator 402. For example, the operator 402 may control the motion of the boom assembly 104 using the first position sensitive controller 412 such that position changes of the first position sensitive controller 412 are repeated by the boom tip. It should be understood that the position changes may not be to scale and a scaling factor may be used to translate controller movements to boom tip movements. For example, a movement of about 3 inches of the first position sensitive controller 412 may be converted to a movement of about 18 inches of the boom tip with a scaling factor of 6.0. However, it should be understood that other scaling factors may be used and, in some embodiments, an operator may select and adjust the scaling factor during operation. Further still, in some embodiments, the scaling factor may be set automatically based on a type of operation being performed by the boom assembly 104 and/or the robotic assembly 420.

Embodiments are contemplated in which both the robotic assembly 420 and the boom assembly 104 may be remotely controlled by one or more operators. Here, the robotic assembly 420 and the boom assembly 104 may be controlled simultaneously using separate input devices or using separate portions of the same input device. Additionally, in some embodiments, the operator may be able to switch modes of a single input device to selectable switch between control of the robotic assembly 420 and the boom assembly 104. For example, an operator may select between a robot control mode, a boom control mode, or other suitable operational control modes. For example, in some embodiments, a plurality of robotic assemblies may be included such that the operator 402 may switch between modes for controlling each respective robotic assembly.

Figure 5:
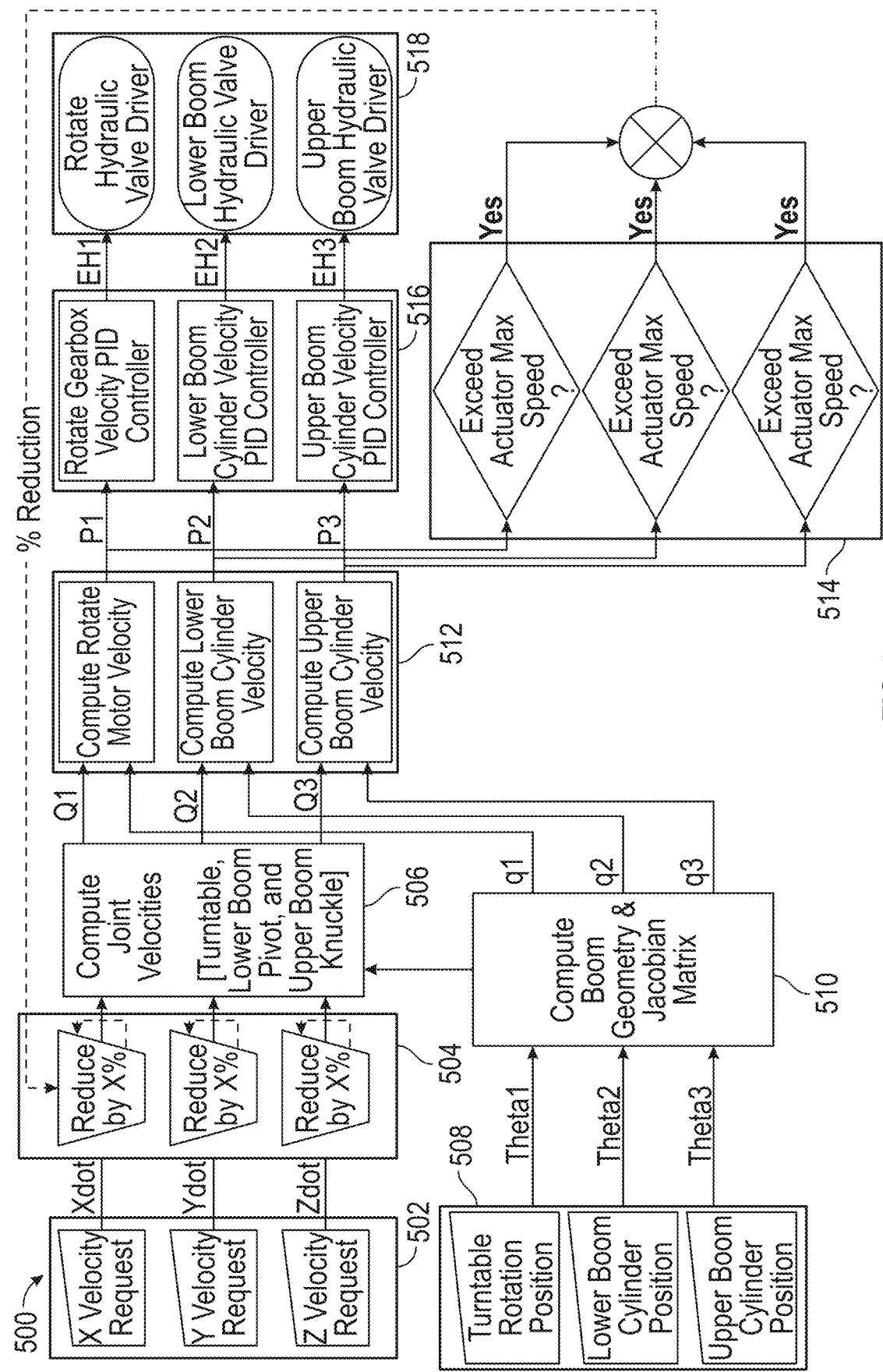
FIG. 5 depicts an exemplary flow diagram for driving manual boom operation relating to some embodiments.

FIG. 5 depicts an exemplary flow diagram 500 for driving manual boom operation relating to some embodiments. In some embodiments, at an operator input stage 502 one or more operator inputs are received for each of three cartesian coordinate directions. For example, a velocity input value may be received for each of the X-direction, Y-direction, and Z-direction. Additionally, embodiments are contemplated in which velocities may be input and computed for any number of directions. Further still, in some embodiments, velocities may be included for any combination of linear directions and rotational axis. For example, in some embodiments, inputs may be received for a motion control system having six degrees of freedom. In some such embodiments, the operator inputs may be requested by an operator via an input device such as a joystick or other controller. In some embodiments, a saturation reduction stage 504 may be included in which a percentage reduction is received to reduce the requested velocity values if at least one of the requested values is saturated, as will be described in further detail below. Accordingly, the speed associated with the motion path may be monitored and if the speed exceeds a predetermined threshold the speed may be reduced for each of the three cartesian directions.

In some embodiments, a joint velocity computation stage 506 may be included in which a joint velocity is computed for each joint of the boom assembly 104 is based on the requested velocity values and a Jacobian matrix for the boom assembly 104. For example, a joint velocity may be computed for each of the turntable 106, the lower boom cylinder 114, and the upper boom cylinder 116. In some embodiments, the joint velocity computation stage 506 provides a motion path for the boom assembly 104 including a plurality of joint velocities to achieve the requested Cartesian velocities at a predetermined point on the boom assembly 104. For example, in some embodiments, the motion path may be generated to achieve a specific velocity vector or position vector of the boom tip.

Further, in some embodiments, a feedback sensor input stage 508 may be included for receiving one or more position inputs indicative of a measured current position of the boom assembly 104. In some embodiments, the position inputs may be received from one or more sensors disposed within the joints of the boom assembly 104. For example, any of a rotary encoder, linear potentiometer, angular potentiometer, gyroscope, other position sensitive sensor (angular or linear), or combinations thereof may be incorporated into the joints of the boom assembly 104 including the turntable 106, the lower boom cylinder 114, and the upper boom cylinder 116. In some embodiments, one or more extension sensors may be included for measuring the extension of the boom cylinders. For example, in some embodiments, one or more string potentiometers may be included internally within the one or more cylinders of the boom assembly 104 for measuring an extension of the respective cylinder. In some embodiments, other types of extension measurement devices may be used such as, magnetostrictive sensors or hall-effect sensors. In some embodiments, magnetostrictive sensors may be utilized in high performance applications. Similarly, in some embodiments, one or more rotary encoders may be disposed on the boom assembly 104 for measuring an angle of rotation of respective joints of the boom assembly 104.

In some embodiments, a boom geometry computation stage 510 may be included for computing the boom geometry and Jacobian matrix based on the received position inputs from the feedback sensor input stage 508 and known dimensions and geometries of the boom assembly 104. In some embodiments, a plurality of predetermined parameters may be received prior to operation indicating the dimensions of the boom sections. In some embodiments, the Jacobian matrix may be generated by taking the partial derivative of the position inputs. The Jacobian matrix may then be provided to the joint velocity computation stage 506 for computing individual joint velocities. In some embodiments, an actuator velocity conversion stage 512 may be included for converting the joint velocities of the joint velocity computation stage 506 into actuator velocities based on the geometry of the boom assembly 104 and specific linkages associated with each joint. Accordingly, in some embodiments, the boom geometry computed at the boom geometry computation stage 510 may be provided to the actuator velocity conversion stage 512. Additionally, embodiments are contemplated in which matrix calculations may be performed ahead of time and results including a plurality of reference values may be stored in a look-up table or other storage structure. In some such embodiments, the real time parameters may be used to approximate between reference values in the look-up table. Accordingly, the processing burden may be reduced during real-time operation such that control latency is further reduced.

In some embodiments, a saturation check stage 514 may be included for limiting the X,Y,Z direction velocity input values based on the physical flow limits of the boom assembly 104. For example, the boom assembly 104 may be at least partially hydraulically actuated such that each hydraulic actuator is associated with a physical flow limit. Further, the sum of all actuators may saturate the flow beyond what a hydraulic pump of the boom assembly is able to produce. Accordingly, the saturation check stage 514 may determine whether any of the actuator limits have been exceeded by the currently requested velocities and if at least one of the physical flow limits is exceeded, a percentage reduction may be applied at the saturation reduction stage 504. In some such embodiments, a percentage value for the reduction may be calculated such that X,Y, and Z velocity inputs are reduced by the same amount until the flow limits are within the limits of the actuators. Alternatively, in some embodiments, a predetermined reduction value may be used. For example, each of the velocities may be reduced by 1%, 50%, or another suitable percentage. In both cases, the reduction in X,Y,Z velocities are the same for each in order to maintain the path accuracy. Conversely, if none of the flow limits are exceeded the percentage reduction is not applied at the saturation reduction stage 504 or a percentage reduction of 0% may be applied.

In some embodiments, a valve command controller stage 516 may be included. Here, a valve command is generated for each of the actuator velocities of the actuator velocity conversion stage 512. In some embodiments, one or more PID controllers may be included for a plurality of hydraulic valves of the boom assembly 104. Accordingly, the PID controllers may be configured to receive a signal indicative of the requested actuator velocities and generate valve commands respectively. In some embodiments, an output valve command stage 518 may be included in which the valve commands are transmitted to the hydraulic valve drivers for adjusting the hydraulic valves to achieve the requested velocities. In some embodiments, the hydraulic valves may be electrically actuated such that the valve commands are received as electrical signals and each valve is operated based on the respective electrical signal. In some embodiments, a hydraulic valve may be included in the boom assembly 104 corresponding to each joint of the boom assembly 104. In some embodiments, the valves may be disposed at each joint. Alternatively, in some embodiments, the valves may be included in a common location such as on a hydraulic manifold disposed at the turntable 106. For example, a rotate hydraulic valve may be disposed in or adjacent to the turntable 106, a lower boom hydraulic valve may be disposed in or adjacent to the lower boom cylinder 114, and an upper boom hydraulic valve may be disposed in or adjacent to the upper boom cylinder 116. In some embodiments, the motion path may be realized by adjusting the extension of the various hydraulic cylinders of the boom assembly 104.

In some embodiments, an extension of one or more telescoping sections of the boom assembly may controlled in a similar fashion as described above. For example, the extension length of the telescoping section may be retracted or extended based on a received movement request from the operator. Typically, movements such as boom extension are controlled separately from other movement of the boom assembly. However, embodiments are contemplated in which the extension of the telescoping section may be adjusted in unison along with other movements of the boom assembly. For example, an operator may request an upward movement of the boom tip and the telescoping section may be extended upward while the hydraulic cylinders are simultaneously adjusted in response to the requested movement. In some embodiments, a machine architecture is provided including four actuators, for example, the boom assembly 104 including the turntable 106, the lower boom cylinder 114, and the upper boom cylinder 116, as well as a telescoping section of the boom as a fourth actuator. In some embodiments, to account for a fourth actuator in a three degrees of freedom motion system any of a maximizing stability parameter, a stationary pose parameter, or a maximizing capacity parameter may be used to add an additional constraint to dictate a solution of the fourth actuator. In some embodiments, similar approaches may be applied for systems with any number of actuators, for example, in a system having seven actuators and six degrees of freedom.

Further, embodiments are contemplated in which additional parameters may be considered while calculating the motion path. For example, in some embodiments, a current payout length of a winch line disposed on the boom assembly 104 may be considered. Here, the payout length may be monitored such that the winch line is not extended past a maximum available length to avoid two-blocking and potential damage. Two-blocking may refer to a condition in which a lower load comes in contact with a higher load leading to substantially large forces applied to the boom assembly 104. Accordingly, embodiments are contemplated in which the motion path may be adjusted based on the payout length of the winch line to prevent a two-blocking condition of the boom assembly 104.

In some embodiments, the process flow described above with reference to FIG. 4 may be used to simplify the controls that the operator has to provide to move the boom. Here, the operator may only provide an indication of the velocities with which the boom tip should be moved instead of individually controlling each joint of the boom assembly 104. Accordingly, a more simplified and intuitive means of collecting operator inputs is provided such that the operators do not need to be capable of providing complex individual boom movements and these movements will be automatically worked out within the motion processing system. Additionally, it should be understood that, in some embodiments, the process described above for driving manual boom operation may also be applied to controlling operation of the robotics assembly 420. For example, a similar process flow may be carried out to control the rotation of the joints within the robotic arms 424 and 428.

It should be understood that a number of different motion paths may be present for a given target position. Accordingly, in some embodiments, various optimizations to the generated motion path may be applied. Here, various adjustments to the motion path may be implemented, for example, based on any of obstacles, singularities, types of work operations, and other factors. In some embodiments, the motion path may be optimized to provide maximized structural strength to the boom assembly 104. Additionally, in some embodiments, the motion path may be optimized for energy conservation. For example, the shortest collective motion path to a destination position for all of the joints may be chosen. Further still, motion paths may be selected based on avoiding collisions and singularities of the boom assembly 104 or the robotic assembly 420.

In some embodiments, the motion path may be calculated using a closed-form inverse kinematics function. Here, the closed-form inverse kinematics provide a significantly faster approach to generating a motion path as compared to open form calculates that typically rely on guess and check methods to converge onto a solution, which consumes large amounts of time and generates substantial input latency. The closed-form inverse kinematics may use predetermined mathematical parameters for the equipment that factor in the geometries and dimensions of the equipment such as the length of one or more members of the robotic arms and the sections of the boom assembly 104. Accordingly, the lengths of the members of the equipment may be automatically accounted for and worked out ahead of time to thereby simplify the real-time calculations that are performed during operation. In some embodiments, the predetermined parameters of the remotely operated equipment allow a closed-form technique to be used that receives one or more inputs and generates one or more outputs without requiring guess and check or repeated iterations to provide a solution.

In some embodiments, the motion path may be determined for a suspended load, for example, disposed at the boom tip. In some such embodiments, a suspended load may be held at the boom tip on or in place of the utility platform 112. For example, in some embodiments, a utility pole or other object may be gripped and supported at the distal end of the boom. Accordingly, the control inputs may be received requesting to execute motion of the suspended load. Accordingly, the operator can intuitively control the positioning and orientation of the suspended load.

In some embodiments, various forms of load monitoring may be applied to monitor one or more loads of the boom assembly 104 or of the robotic assembly 420. Accordingly, in some embodiments, haptic feedback and/or other forms of feedback may be generated in response to a detected load. A feedback response may include any combination of haptic feedback such as vibration of a controller or other user device, visual feedback such as a flashing light, or audible feedback such as a ringing alarm. In some embodiments, an intensity or frequency of the feedback may be determined proportional to the load. For example, a less intense feedback response may be generated for a load of 200 pounds as compared to a load of 500 pounds.

Further, in some embodiments, the intensity (or frequency) of the feedback response may be selected granularly based on a comparison of a measured load to a predetermined maximum load value such that the intensity increases as the measured load approaches the maximum load value. In some embodiments, the intensity and/or frequency may vary according to an exponential function such that load changes at higher loads closer to the maximum load value are more noticeable to the operator. In some embodiments, linear functions and other types of feedback functions are also contemplated. In some embodiments, the intensity and/or frequency of the feedback response may become saturated after a certain load value is exceeded. For example, in some embodiments, the feedback response may become saturated when the maximum load value is exceeded such that the feedback response is similar at and above the maximum load.

In some embodiments, the feedback response may be communicated such that the operator is notified without looking away from the work area or losing focus. For example, any of vibration, lights, or an audible alarm may be activated within controllers 412 and 414, display 406, and speakers 408, respectively.

Additionally, embodiments are contemplated in which the velocities of the boom cylinders and the motion path may be automatically adjusted based on one or more measured loads. For example, if a heavy load of 400 pounds is suspended at the boom tip the velocities of the valve commands may be automatically increased such that the boom assembly 104 moves at a similar speed as if there was no load suspended at the boom tip. Alternatively, in some embodiments, the valve commands may not be increased based on a measured load such that the boom assembly moves slower while supporting a heavy load to ensure additional caution. Further, in some embodiments, pressure-compensated hydraulic valves may be used such that the motion speeds are independent of varying load amounts. Further still, embodiments are contemplated in which allowed accelerations of the boom assembly are limited based on a sensed load to thereby minimize dynamic loading conditions and shock loading on the structures of the boom assembly 104. For example, if a heavy load of 400 pounds is being supported at the boom tip, an acceleration limit may be reduced based on the 400 pounds of additional weight to prevent dynamic loading affects and shock associated with quickly accelerating a large load.

Figure 6:
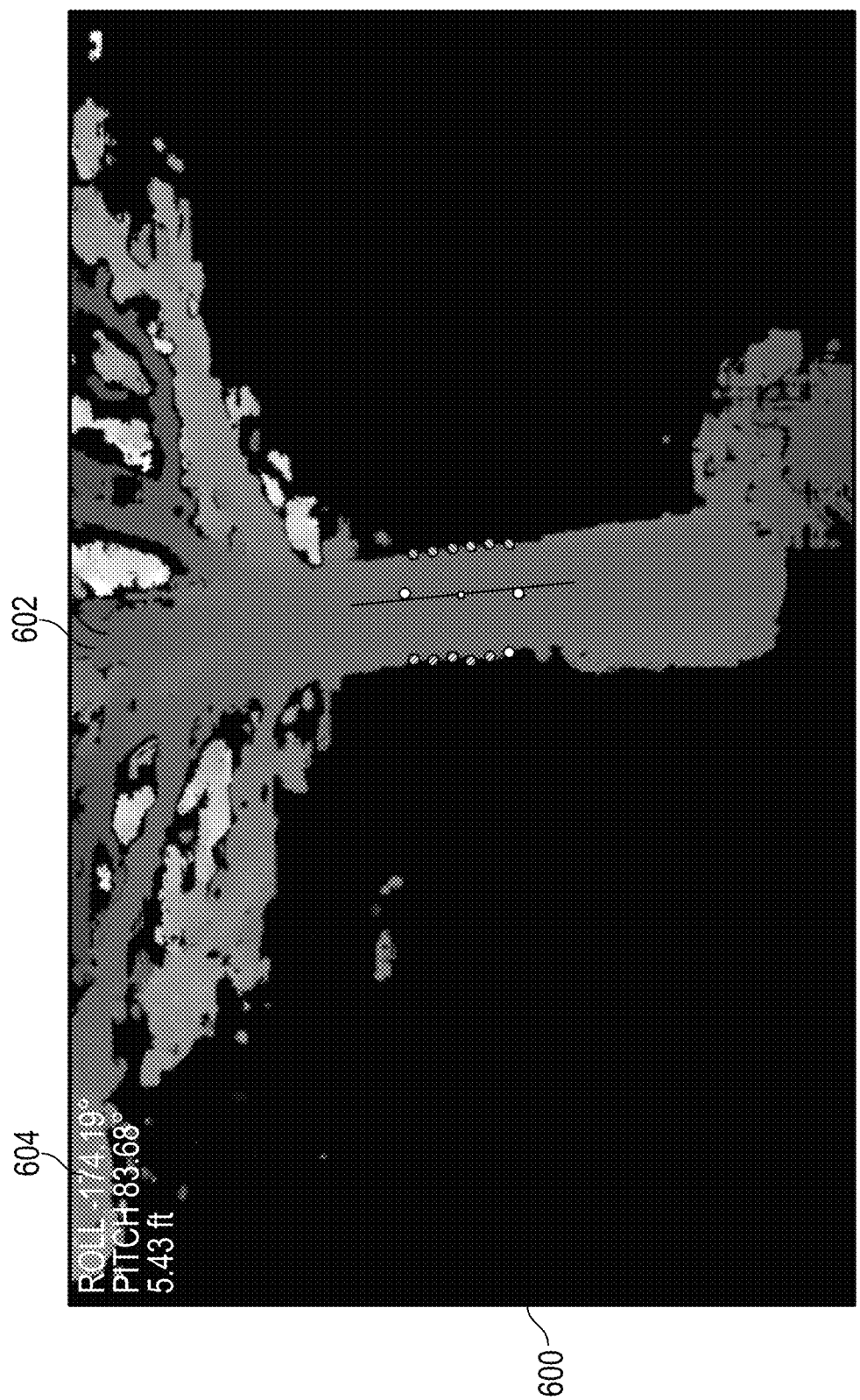
FIG. 6 depicts an exemplary lidar scan image relating to some embodiments.

FIG. 6 depicts an exemplary depth scan image 600 relating to some embodiments. In some embodiments, a plurality of stereoscopic depth images may be captured by the depth sensor 438 to collect 3-dimensional information about the work area of the robotic assembly 420. For example, a point cloud comprising a plurality of 3-dimensional points may be generated from the depth data captured by the depth sensor 438. Here, the point cloud may include a 3-dimensional representation of the work area. Accordingly, the point cloud may be used to detect one or more objects and obstacles within the work area. For example, the point cloud may be used to locate and identify a utility pole that is to be operated on by the boom assembly 104 and/or the robotic assembly 420. Further, in some embodiments, the point cloud generated from the depth data may be used to locate and identify obstacles such as trees or other obstructions present in the work area. In some embodiments, the point cloud may be generated from a plurality of depth images captured by the depth sensor 438 or camera 434 over time from a variety of different positions and perspectives. For example, in some embodiments, before beginning operation, the robotic assembly 420 may be moved around the work area to capture a plurality of images and depth data to generate the point cloud. Further still, in some embodiments, additional depth data from one or more additional sources may be used to generate the point cloud. For example, depth data captured by the sensor 462 on the drone 460, as shown in FIG. 4, may be combined with depth data from the depth sensor 438 to generate a more complete point cloud. Here, the drone 460 may be used to capture depth data that is not visible or is inaccessible to the robotic assembly 420.

Additionally, embodiments are contemplated in which the drone 460 may be used to capture 3-dimensional depth data to generate a point cloud prior to operation of the remotely operated equipment. For example, the drone 460 may be positioned in the work area to capture depth data used to generate a 3-dimensional representation of the work area before work begins such that operations may be planned ahead of time. In some embodiments, a point cloud may be generated ahead of time such that automated routines of the remotely operated equipment may be tested in a simulation environment employing the generated point cloud.

In some embodiments, an object 602 may be identified within the lidar scan image 600. For example, the identified object 602 may be a tree, as shown, or another object within the work area of the robotic assembly 420. In some embodiments, additional information 604 may be included with the exemplary lidar scan image 600, as shown. In some embodiments, the additional information 604 may include an indication of an angle associated with the exemplary lidar scan image 600 along with a range associated with the exemplary lidar scan image 600. For example, the additional information 604 may include one or more angles associated with the position of the depth sensor 438 when the image was captured. Similarly, the range may include a distance to a point of interest associated with the lidar scan image 600.

In some embodiments, the lidar scan image 600 may be generated at a starting phase of the robotic assembly 420. For example, before beginning work in the work area, the robotic assembly 420 may capture a plurality of lidar scans at a respective plurality of positions and angles. The plurality of lidar scans may then be stitched together to form a more complete point cloud that is stored and considered during operation of the robotic assembly 420. Accordingly, the point cloud may be stored and retrieved to provide awareness of objects in the work area that are not visible or are otherwise outside of the current view of the cameras 434. In some embodiments, the lidar scans may be further updated with real-time depth data captured during operation. In some embodiments, the depth data may be periodically updated or updated based on a sensed change within the work area, such as an obstacle moving, entering the work area, or exiting the work area.

Figure 7:
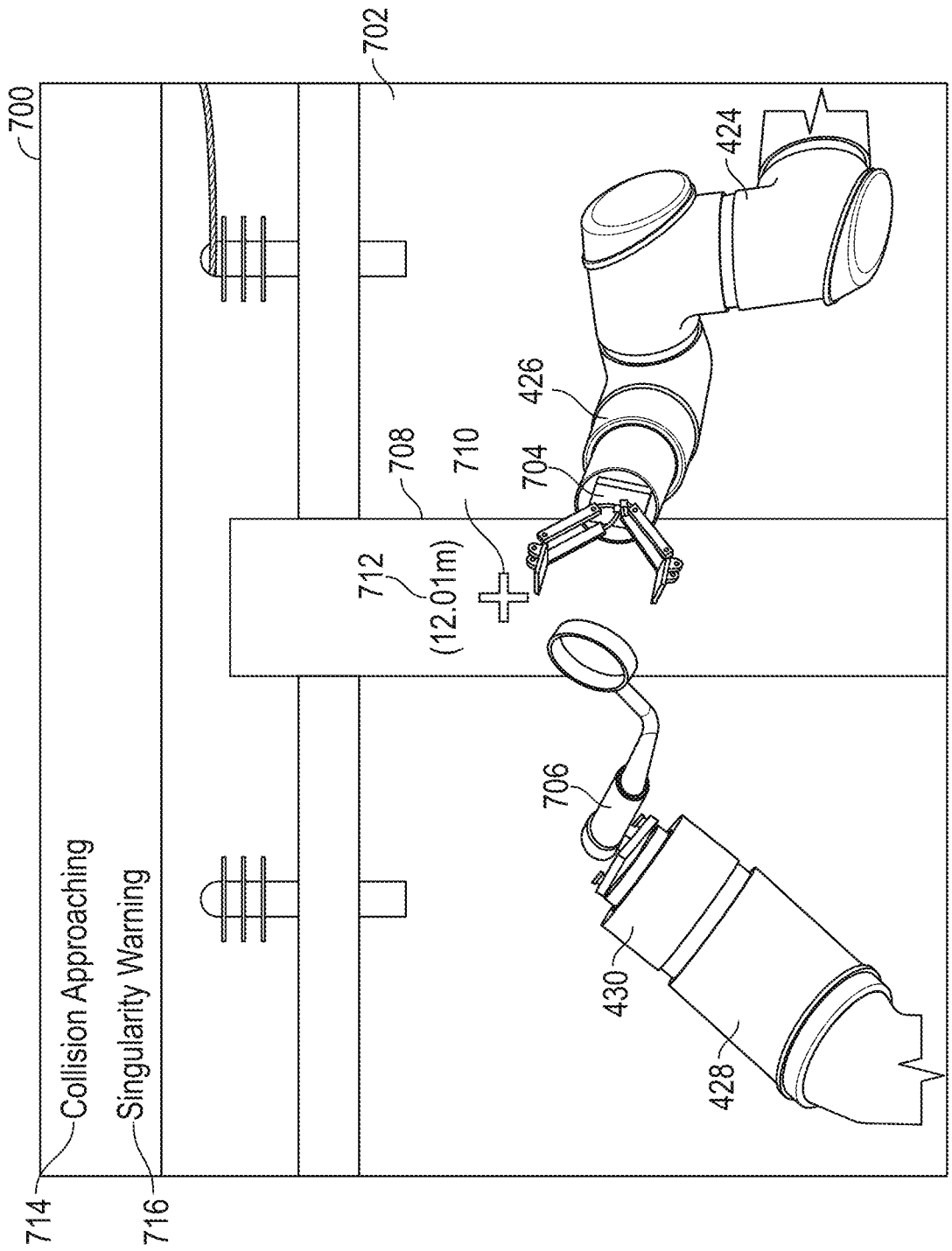
FIG. 7 depicts an exemplary heads-up display (HUD) relating to some embodiments.

FIG. 7 depicts an exemplary heads-up display (HUD) 700 relating to some embodiments. In some such embodiments, the HUD 700 may be displayed on the at least one display 406 of the user device 404. In some embodiments, the HUD 700 includes a real-time image 702 captured by the one or more cameras 434 at the work area of the robotic assembly 420. Accordingly, in some embodiments, either or both of the first robotic arm 424 and the second robotic arm 428 may be visible within the real-time image 702, as shown. In some embodiments, the real-time image 702 may be continuously updated in real time to provide video data captured by the cameras 434.

In some embodiments, one or more tools may be secured to the first robotic arm end 426 and the second robotic arm end 430. For example, a gripping tool 704 may be secured to the first robotic arm end 426 and a hotstick tool 706 may be secured to the second robotic arm end 430, as shown. However, it should be understood that a variety of other types of tools are also contemplated. For example, in some embodiments, any of a number of lineman tools and other tools may be adapted for use by the robotic assembly 420.

In some embodiments, an obstacle or item of interest may be visible in the real-time image 702. For example, a utility pole 708 may be visible within the real-time image 702, as shown. Further, in some embodiments, a reticle 710 or pointer may be included in the HUD 700 for indicating a point of interest within the real-time image 702. In some such embodiments, the reticle 710 may be used to select a specific point to request additional information associated with the point or to perform an operation with the robotic assembly 420 at the point. In some embodiments, the reticle 710 may be positioned at a center of the real-time image 702. Alternatively, in some embodiments, the reticle 710 may be selectably repositioned by the operator 402. For example, the operator 402 may adjust the position of the reticle 710 using a joystick, such as a 3-axis joystick, or other input device. Further, embodiments are contemplated in which the position of the reticle 710 may be adjusted based on an eye focus or gaze of the operator 402. For example, a gaze recognition sensor may be included within the headset of the operator 402 to monitor the direction of the operator's gaze and change the position of the reticle 710 accordingly. In such embodiments, the gaze recognition sensor may be configured to monitor the position and direction of the operator's pupils such that the reticle 710 may be moved to a point of focus of the operator.

Additionally, in some embodiments, the reticle 710 may be used to request an updated motion path of the remotely operated equipment. For example, embodiments are contemplated in which an operator may position the reticle 710 and select a position for either of the boom tip or the robotic assembly 420 to be moved to. Accordingly, a set of coordinates associated with the location of the reticle 710 may define an updated target position for the motion path. As such, the operator may intuitively select an endpoint position from within the HUD 700 to control movement of the remotely operated equipment. For example, the operator may point and click at the utility pole 708 such that the robotic assembly 420 is moved into position adjacent to the utility pole 708. Additionally, in some embodiments, the operator may update the target position, for example, by tapping a touch screen on which the real-time image 702 is displayed or by clicking with a mouse or other suitable input device.

In some embodiments, additional information may be displayed within the HUD 700 based on the reticle 710. For example, in some embodiments, a range indicator 712 may be included showing a measured range to a position of the reticle 710. Here, depth data from the depth sensor 438 may be used to determine a range associated with the position of the reticle 710. Additionally, in some embodiments, specific 3-dimensional coordinates may be generated and displayed corresponding to the position of the reticle 710 within the 3-dimensional representation of the work area.

In some embodiments, a collision warning indicator 714 may be included within the HUD 700, as shown, including an indication of an approaching collision of the robotic assembly 420. In some embodiments, the collision warning indicator 714 may be generated in response to detecting a potential collision with an obstacle in the work area of the robotic assembly 420. For example, if one of the robotic arms is approaching a tree branch the collision warning indicator 714 may be generated and displayed in the HUD 700. In some embodiments, potential collisions may be preemptively monitored, for example, using the point cloud data captured by the depth sensor 438. Additionally, in some embodiments, a singularity warning indicator 716 may be included within the HUD 700, as shown, including an indication of a potential singularity condition of the robotic assembly 420. In some embodiments, the singularity warning indicator 716 may be generated and displayed in response to detecting a potential singularity in the motion path of the robotic assembly 420. In some embodiments, the collision warning indicator 714 and the singularity warning indicator 716, as shown, may be augmented with or replaced with one or more other indicators such as audible alarms, flashing lights, and other suitable types of warning indicators. Further, embodiments are contemplated in which the motion paths of either of the robotic assembly 420 or the boom assembly 104 may be automatically adjusted based on indications of potential collisions or singularities.

Embodiments are contemplated in which the depth data may also be used to perform interactions with one or more objects within the work area of the robotic assembly 420. For example, in some embodiments, depth data from the depth sensor 438 may be used to locate and identify a bolt to be manipulated by the robotic assembly 420. Here, the depth data and generated point cloud may be used to adjust the motion path of the robotic assembly 420 to thereby interact with the bolt to perform a tightening or loosening operation on the bolt. It should be understood that this is just one example of the robotic assembly 420 interacting with an object and that the depth data may also be used to grasp objects and perform other operations automatically or manually.

In some embodiments, an additional real-time image may be displayed corresponding to image data captured by the drone 460. For example, in some embodiments, an additional window such as a picture-in-picture display may be included showing images captured by the at least one sensor 462 of the drone 460. Alternatively, or additionally, in some embodiments, the operator 402 may selectably toggle between camera views. Accordingly, the drone 460 may provide additional views not accessible to the camera 434 of the robotic assembly 420. Further, in some embodiments, one or more stationary cameras may also be included, for example, disposed on a utility pole in the work area of the robotic assembly 420 to provide additional viewing angles. As such, embodiments are contemplated in which image data or depth data from multiple distinct sources are combined in real-time and displayed to an operator to aid in remote operation of equipment.

Figure 8A:
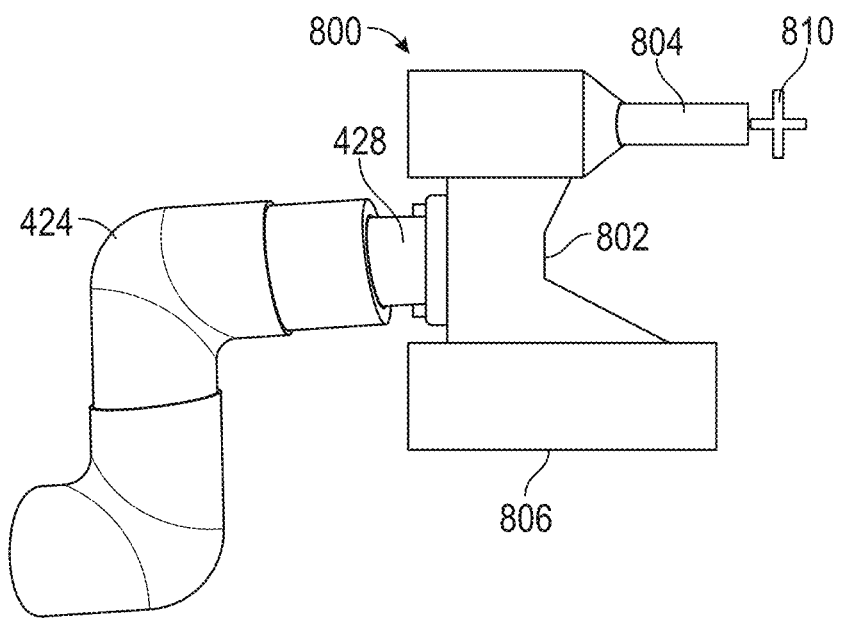
FIG. 8A depicts an exemplary tool relating to some embodiments.
Figure 8B:
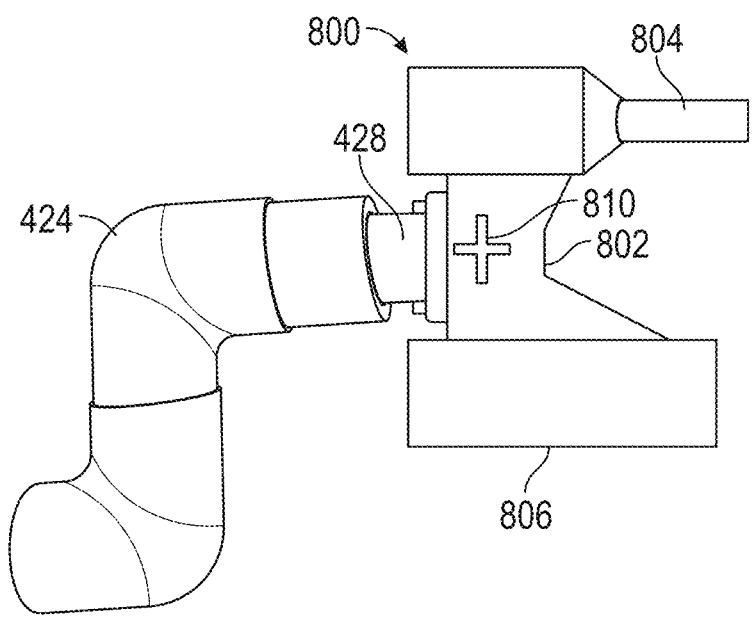
FIG. 8B depicts an exemplary tool relating to some embodiments.

FIGS. 8A and 8B depict an exemplary tool 800 adapted to be held by the robotic arm 424 relating to some embodiments. In some embodiments, the tool 800 is a drill tool comprising a drill handle 802 and a drill bit 804, as shown. In some embodiments, the tool 800 comprises a power source 806 such as a battery. However, embodiments are also contemplated in which the tool 800 does not include a power source 806 and receives power or is actuated by the robotic arm 424.

FIG. 8A depicts the tool 800 with a motion point 810 positioned at a tip of the drill bit 804. In some embodiments, the motion point 810 may define a set of 3D coordinates that correspond to the point of interest of the motion controls. Accordingly, if the motion point 810 is positioned at the tip of the drill bit 804, as shown, the motion path of the robotic assembly 420 may be synced to the position sensitive controller 412 such that this point of the tool 800 follows the operator's hand position (or the position of the position sensitive controller 412). As such, the operator 402 may feel like they are holding the tool 800 at the drill bit 804.

FIG. 8B depicts the tool 800 with the motion point 810 shifted to the drill handle 802. In some embodiments, the motion point 810 may be shifted to the drill handle 802 such that it feels like the operator 402 is holding the tool 800 by the drill handle 802. In some embodiments, the motion point 810 may be selectably chosen by the operator 402. Additionally, or in the alternative, in some embodiments, the motion point 810 may be automatically determined or adjusted based on a type of tool currently equipped by the robotic arms 424 and 428. For example, the motion point 810 may be automatically updated if the robotic assembly 420 switches from the gripping tool 704 to the hotstick tool 706. In some embodiments, the motion point 810 may be selected to mimic a typical hand position of an operator while holding a certain type of tool. By selecting the motion point 810 based on the type of tool a more natural feeling is provided to the operator making the motion control more intuitive and preventing operator error.

It should be understood that the techniques, features, and improvements described herein are not limited to boom assemblies, aerial devices, and robotic assemblies, and that said techniques, features, and improvements may be applied to a number of other types of remotely controlled equipment not explicitly described herein. Further, any of the techniques described herein with respect to the robotic assembly 420 may also be used for the boom assembly 104 and other aerial devices. Similarly, in some embodiments, the techniques described with respect to the boom assembly 104 may also be applied to the robotic assembly 420 or other remotely operated equipment.

Figure 9:
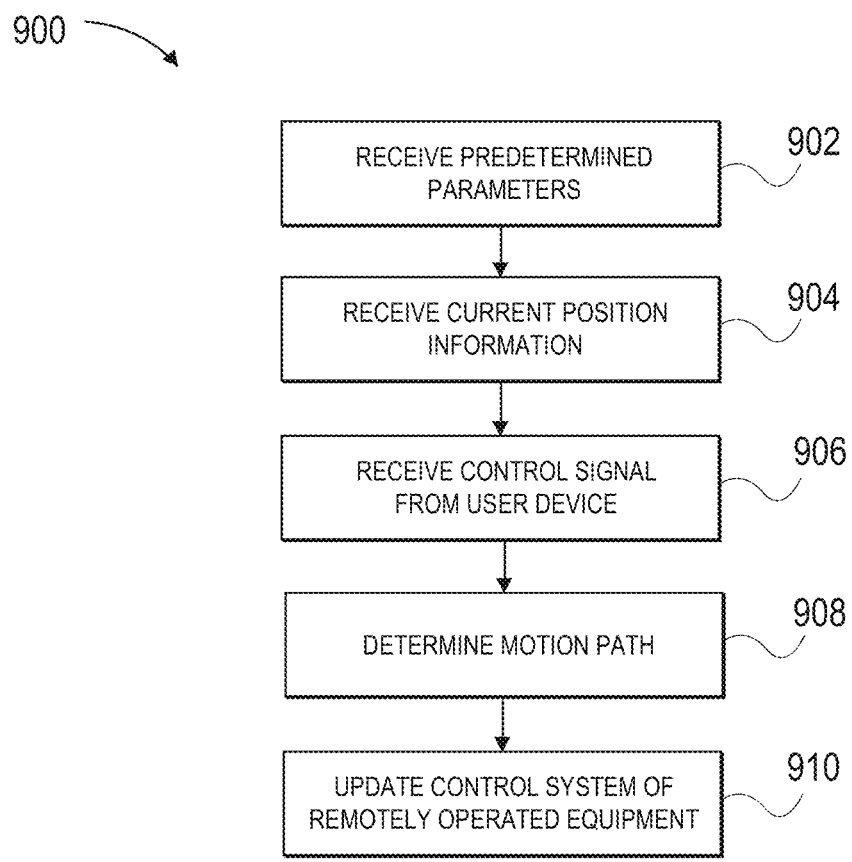
FIG. 9 depicts an exemplary method of controlling motion of remotely operated equipment relating to some embodiments.

FIG. 9 depicts an exemplary method 900 of controlling motion of remotely operated equipment relating to some embodiments. In some embodiments, the method 900 may be performed by the user device 404, or by the computing device 439 or a controller of the robotic assembly 420. In some embodiments, the method 900 may be carried out by executing non-transitory computer-readable media by at least one processor. For example, the at least one processor may be programmed to perform one or more steps of the method 900.

At step 902, one or more predetermined parameters are received. In some embodiments, the predetermined parameters are based on one or more dimensions of the remotely operated equipment such as a length of one or more members of the remotely operated equipment. In some embodiments, the predetermined parameters include one or more mathematical parameters corresponding to the remotely operated equipment.

At step 904, information indicative of the current position of the remotely operated equipment is received. In some embodiments, the information comprises an angle of rotation of one or more joints of the remotely operated equipment. Additionally, the information may include XYZ coordinates of the members and joints of the remotely operated equipment. In some embodiments, the XYZ coordinates may be included within the point cloud such that the position of the remotely operated equipment is considered within the 3-dimensional representation of the work area.

At step 906, a control signal is received from at least one input device. In some embodiments, the control signal is indicative of an updated target position requested by an operator. In some embodiments, the control signal may be received from a user device such as a keyboard, a joystick, a controller, or another suitable input device. For example, the control signal may be generated by tracking motion of the position sensitive controller 412.

At step 908, a motion path is determined for the remotely operated equipment. In some embodiments, the motion path is determined by applying a closed-form inverse kinematics function based on the current position of the remotely operated equipment, the updated target position, and the predetermined parameters. For example, in some embodiments, the closed-form inverse kinematics function may be configured to receive the current position, target position, and predetermined parameters as inputs and output a motion path for controlling motion of the joints and members of the remotely operated equipment to move towards the target position. Additionally, in some embodiments, other parameters may be considered in determining the motion path. For example, in some embodiments, the point cloud generated from the depth data may be considered to avoid unintended collisions of the remotely operated equipment. Further, in some embodiments, singularities of the joints and members of the remotely operated equipment may be considered in the determination such that the remotely operated equipment avoids singularities.

At step 910, a control system of the remotely operated equipment is updated with the motion path. Here, the motion path may include instructions for adjusting the angle of rotation of the one or more joints of the remotely operated equipment. In some embodiments, the motion path includes instructions for extending hydraulic cylinders associated with the remotely operated equipment. In some embodiments, the motion path is updated continuously in real-time as control inputs are received from an operator. Accordingly, the remotely operated equipment continuously follows the target position requested by the operator.

The following U.S. patent applications, each filed Jul. 28, 2022, are each hereby incorporated by reference in their entirety as if set forth herein verbatim: U.S. Application Ser. No. 63/392,927, titled "REDUCING LATENCY IN HEAD-MOUNTED DISPLAY FOR THE REMOTE OPERATION OF MACHINERY"; U.S. application Ser. No. 17/875,674, titled "MANUAL OPERATION OF A REMOTE ROBOT ASSEMBLY"; U.S. application Ser. No. 17/875,710, titled "AUTONOMOUS AND SEMI-AUTONOMOUS CONTROL OF AERIAL ROBOTIC SYSTEMS"; U.S. application Ser. No. 17/875,743, titled "COORERATIVE HIGH-CAPACITY AND HIGH-DEXTERITY MANIPULATORS"; U.S. application Ser. No. 17/875,796, titled "ROTARY TOOL FOR REMOTE POWER LINE OPERATIONS"; U.S. application Ser. No. 17/875,821, titled "OPERATION AND INSULATION TECHNIQUES"; U.S. application Ser. No. 17/875,943, titled "WIRE TENSIONING SYSTEM"; U.S. application Ser. No. 17/875,990, titled "CROSS-ARM PHASE-LIFTER"; and U.S. Application Ser. No. 63/393,047, titled "ELECTRICALLY INSULATING BLANKET WITH MEMORY SET". The subject matter described in the foregoing U.S. patent applications may be combined with the subject matter of the present disclosure. For example, one or more embodiments, features, structures, acts, etc. described in any one or more of the foregoing U.S. patent applications may be combined with one or more embodiments, features, structures, acts, etc. described in the present disclosure.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A method of controlling motion of a remotely operated equipment communicatively coupled to at least one input device of an operator, the method comprising:
  receiving predetermined parameters based on one or more dimensions of the remotely operated equipment including a length of one or more members of the remotely operated equipment;
  receiving information indicative of a current position of the remotely operated equipment, the information comprising an angle of rotation of one or more joints of the remotely operated equipment;
  receiving a control signal from the at least one input device, the control signal indicative of an updated target position requested by the operator;
  determining a motion path for the remotely operated equipment by applying a closed-form inverse kinematics function based on the current position of the remotely operated equipment, the updated target position, and the predetermined parameters;
  updating a control system of the remotely operated equipment with the motion path,
  wherein the motion path comprises instructions for adjusting the angle of rotation of the one or more joints of the remotely operated equipment;
  responsive to receiving a user input, temporarily preventing motion of the remotely operated equipment;
  receiving an adjustment of a position of the at least one input device while the remotely operated equipment is locked in place; and
  resuming motion of the remotely operated equipment responsive to a subsequent user input from the at least one input device requesting to resume motion of the remotely operated equipment.

2. The method of claim 1, further comprising:
  monitoring a speed associated with the motion path of the remotely operated equipment; and
  if the speed is above a predetermined threshold, reducing one or more speed parameters of the motion path.

3. The method of claim 1, further comprising:
  receiving a selection of a selected tool from a plurality of tool associated with the remotely operated equipment; and
  shifting the updated target position based on the selected tool of the remotely operated equipment.

4. The method of claim 3, wherein the information indicative of the current position of the remotely operated equipment further comprises a position and an angle of rotation of the selected tool.

5. The method of claim 4, further comprising:
  preemptively monitoring one or more potential singularities of the remotely operated equipment; and
  automatically adjusting the motion path to avoid the one or more potential singularities of the remotely operated equipment.

6. The method of claim 1, further comprising:
  preemptively monitoring one or more potential collisions of the remotely operated equipment; and
  automatically adjusting the motion path to avoid the one or more potential collisions of the remotely operated equipment.

7. The method of claim 1, wherein at least a portion of the remotely operated equipment is configured to be electrically bonded to an energized power line, and wherein the control signal is transmitted across an electrically isolated dielectric gap via one or more fiber optic cables to thereby prevent grounding of the energized power line.

8. A system for remote motion control, the system comprising:
  a boom assembly communicatively coupled to at least one input device of an operator, the boom assembly comprising:
    a plurality of boom sections including a boom tip configured to be disposed in an energized environment; and
    one or more cylinders disposed at joints of the plurality of boom sections;
  a control system including at least one processor programmed to execute a method of controlling motion of the boom assembly, the method comprising:
    receiving predetermined parameters based on one or more dimensions of the boom assembly;
    receiving information indicative of a current position of the boom assembly, the information comprising:
      an extension of the one or more cylinders of the boom assembly; and
      an angle of rotation of the boom assembly;
    receiving a control signal from the at least one input device, the control signal indicative of an updated target position for the boom tip of the boom assembly requested by the operator,
    wherein the control signal is transmitted across an electrically isolated dielectric gap via one or more fiber optic cables;
    determining a motion path for the boom assembly based on the current position of the boom assembly, the updated target position for the boom tip, and the predetermined parameters; and
    updating the control system of the boom assembly with the motion path,
    wherein the motion path comprises instructions for adjusting the extension of the one or more cylinders of the boom assembly and instructions for adjusting the angle of rotation of the boom assembly.

9. The system of claim 8, wherein the information indicative of the current position of the boom assembly further comprises a payout length of a winch line associated with the boom assembly.

10. The system of claim 9, the method further comprising:
  monitoring the payout length of the winch line; and
  adjusting the motion path based on the payout length of the winch line to avoid a two-blocking condition of the boom assembly.

11. The system of claim 10, wherein the motion path for the boom assembly comprises:
  an adjustment to the angle of rotation of the boom assembly;
  an adjustment to the extension of the one or more cylinders of the boom assembly; and
  an adjustment to the payout length of the winch line.

12. The system of claim 8, wherein the extension of the one or more cylinders of the boom assembly is measured via one or more magnetostrictive sensors and the angle of rotation of the boom assembly is measured via a rotary encoder disposed on the boom assembly.

13. The system of claim 8, wherein the motion path is determined by applying a closed-form inverse kinematics function based on the current position of the boom assembly, the updated target position for the boom tip, and the predetermined parameters.

14. The system of claim 8, wherein the at least one input device comprises at least one 3-axis joystick or at least one 6-axis joystick.

15. A method of controlling motion of a robotic arm communicatively coupled to at least one input device of an operator, the at least one input device including a position sensitive controller configured to be held by the operator, the method comprising:
   receiving predetermined parameters based on one or more dimensions of the robotic arm including a length of one or more members of the robotic arm;
   receiving information indicative of a current position of the robotic arm, the information comprising an angle of rotation of the one or more members of the robotic arm;
   receiving a control signal from the at least one input device, the control signal indicative of an updated target position corresponding to a position of the position sensitive controller;
   determining a motion path for the robotic arm by applying a closed-form inverse kinematics function based on the current position of the robotic arm, the updated target position, and the predetermined parameters;
   updating a control system of the robotic arm with the motion path to synchronize motion of a point on the robotic arm with motion of the position sensitive controller;
   responsive to receiving a user input from the at least one input device, temporarily preventing motion of the robotic arm while a body position of the operator is adjusted; and
   resuming motion of the robotic arm responsive to a subsequent user input from the at least one input device requesting to resume motion of the robotic arm.

16. The method of claim 15, further comprising:
   preemptively monitoring one or more potential singularities of the robotic arm; and
   providing, via the at least one input device, a notification indicative of the one or more potential singularities of the robotic arm.

17. The method of claim 16, wherein the notification initiates activation of a haptic feedback response within the position sensitive controller.

18. The method of claim 15, further comprising:
   transmitting information indicative of the motion path across a dielectric gap via one or more fiber-optic cables to the control system of the robotic arm.

19. The method of claim 15, further comprising:
   determining a speed for the motion path relative to a speed of the position sensitive controller.

20. The method of claim 15, further comprising:
   identifying a home position of the at least one input device; and
   updating the home position of the at least one input device relative to the body position of the operator.

* * * * *